USO05907653A

United States Patent [19]
Burek et al.

[11] Patent Number: 5,907,653
[45] Date of Patent: May 25, 1999

[54] RACETRACK GROMMET FOR OPTICAL FIBER CABLE SPLICE CLOSURE

[75] Inventors: Denis Edward Burek, Cumming; Marc Duane Jones; William H. Small, both of Lithonia, all of Ga.

[73] Assignee: Lucent Technologies Inc., Murray Hill, N.J.

[21] Appl. No.: 08/848,788

[22] Filed: May 1, 1997

[51] Int. Cl.[6] ...................................................... G02B 6/36
[52] U.S. Cl. ........................................................... 385/135
[58] Field of Search ..................................... 385/134, 135

[56] References Cited

U.S. PATENT DOCUMENTS

| | | | |
|---|---|---|---|
| 3,875,325 | 4/1975 | Anderson et al. | 174/92 |
| 4,295,005 | 10/1981 | Daugherty et al. | 174/92 |
| 4,332,435 | 6/1982 | Post | 350/96.21 |
| 4,679,896 | 7/1987 | Krafcik et al. | 350/96.2 |
| 4,754,876 | 7/1988 | Noon et al. | 385/135 |
| 4,818,824 | 4/1989 | Dixit et al. | 174/92 |
| 5,097,529 | 3/1992 | Cobb et al. | 385/135 |
| 5,189,725 | 2/1993 | Bensel, III et al. | 385/135 |
| 5,420,957 | 5/1995 | Burek et al. | 385/135 |
| 5,434,945 | 7/1995 | Burek et al. | 385/135 |
| 5,440,666 | 8/1995 | Burek et al. | 385/135 |
| 5,450,518 | 9/1995 | Burek et al. | 385/135 |
| 5,472,160 | 12/1995 | Burek et al. | 248/74.4 |
| 5,481,639 | 1/1996 | Cobb et al. | 385/135 |
| 5,519,804 | 5/1996 | Burek et al. | 385/135 |
| 5,556,060 | 9/1996 | Bingham et al. | 385/135 |
| 5,631,993 | 5/1997 | Cloud et al. | 385/135 |
| 5,696,864 | 12/1997 | Smith et al. | 385/135 |
| 5,754,724 | 5/1998 | Paterson et al. | 385/135 |

OTHER PUBLICATIONS

Simultaneous Voice and Data on the General Switch Telephone Network Using Framed QADM, IEEE Communications Magazine, Dec. 1996, By: Gordon Bremer, Paradyne Corp. and Ken Ko, Rockwell Semicon. Sys., pp. 58–63.

*Primary Examiner*—Hung N. Ngo

[57] ABSTRACT

A racetrack grommet of resilient material for use in providing a seal between two flanged closure members has first and second spaced sides thereon adapted to be positioned between the flanges, and transverse end sections having insert receiving members having bores therein. Insert members are configured to fit within the bores in end to end butting relationship to provide a seal between a cable entering or leaving the assembled closure and the insert receiving members which, in turn, provide seals for end openings in the assembled closure. The bores in the insert receiving members have holding and sealing means therein and each insert has mating means thereon for mating with the holding means to provide a seal between each of the insert members and the insert receiving member. One or more port plugs seal the unused bores in the insert receiving members. Each insert has a split thereon to facilitate insertion of a cable within the insert, and each insert receiving member has a split therein for facilitating insertion of an insert therein.

31 Claims, 22 Drawing Sheets

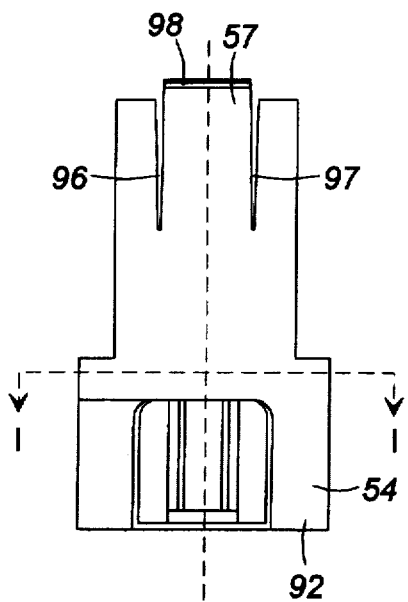
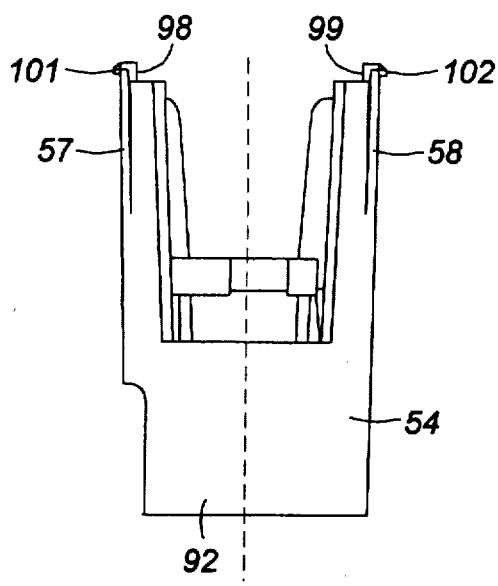
FIG. 5A  FIG. 5B
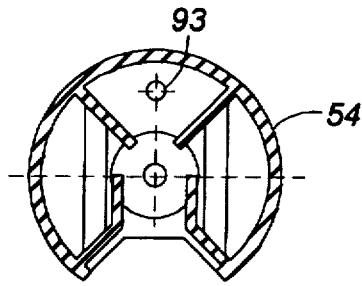
FIG. 5C
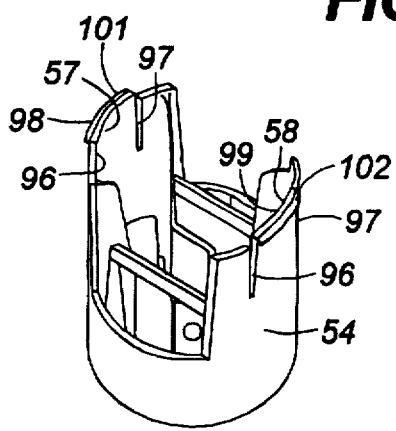
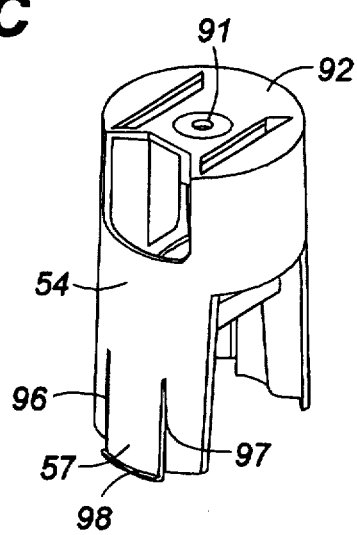
FIG. 5D  FIG. 5E

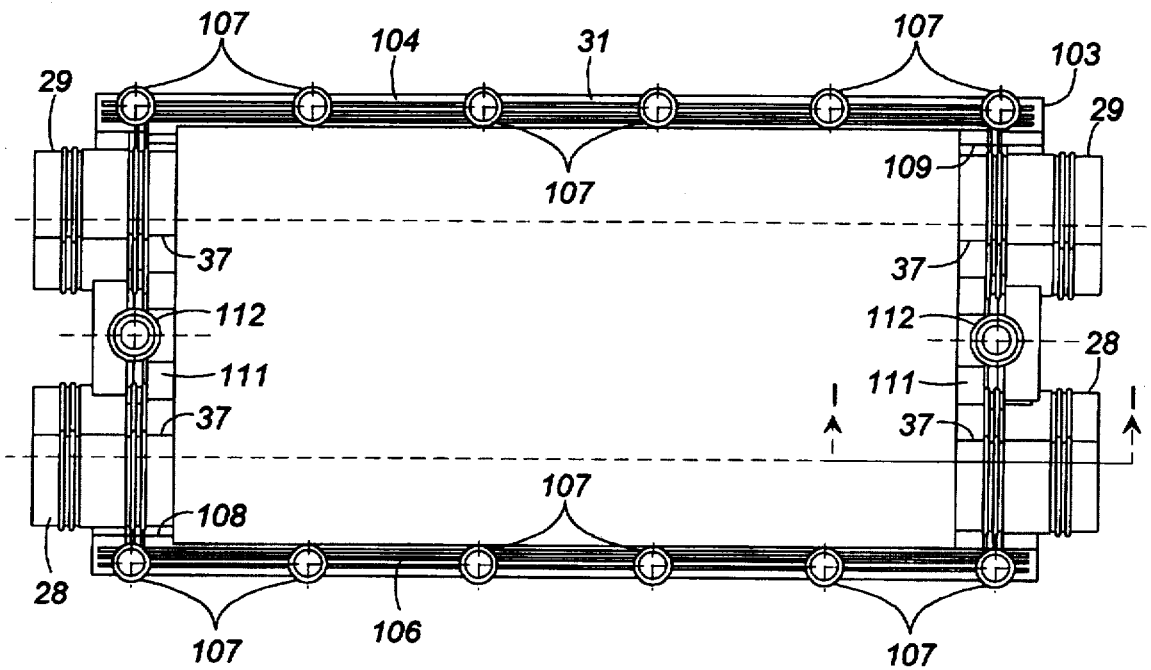
FIG. 6A
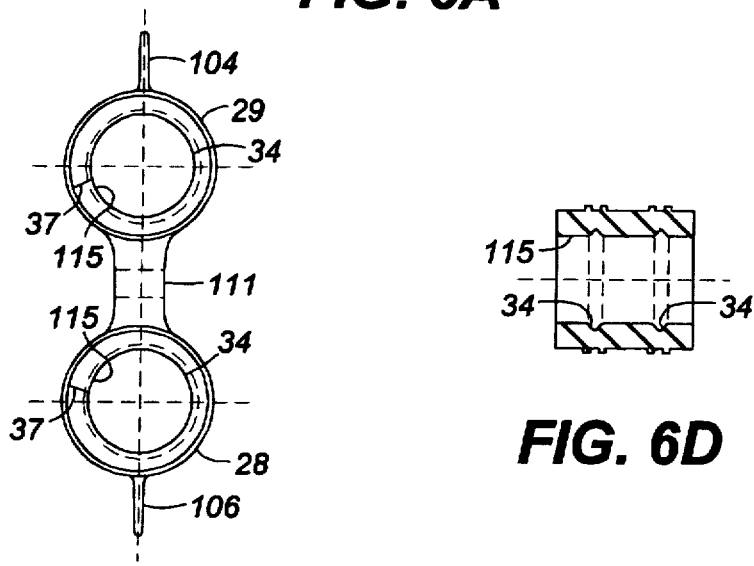
FIG. 6B
FIG. 6D
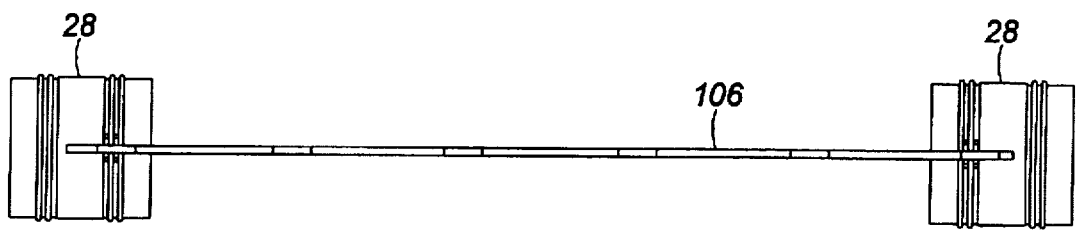
FIG. 6C

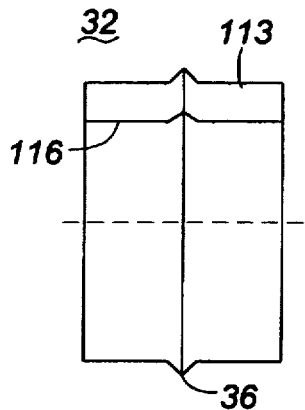
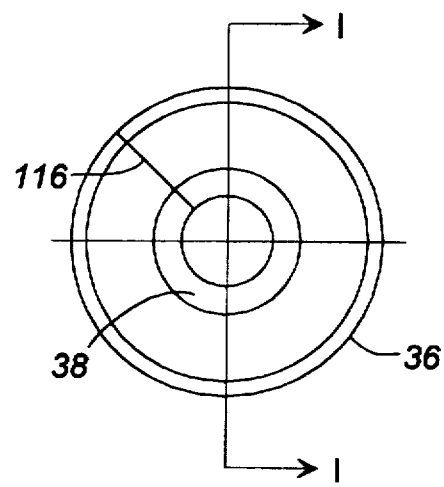
FIG. 7A  FIG. 7B
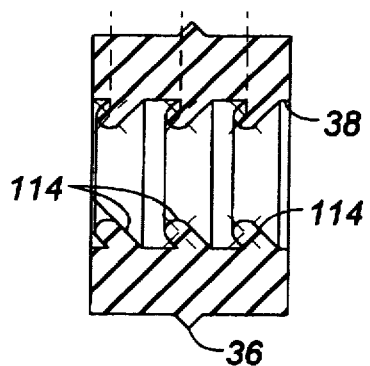
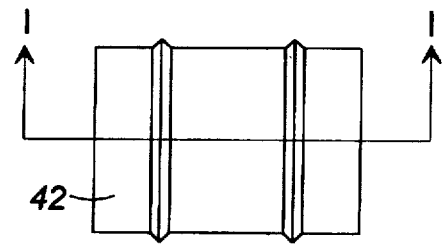
FIG. 7C  FIG. 8A
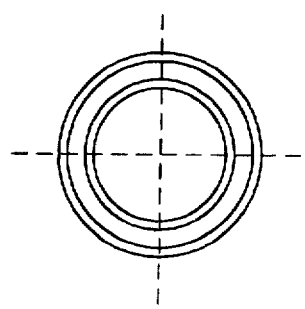
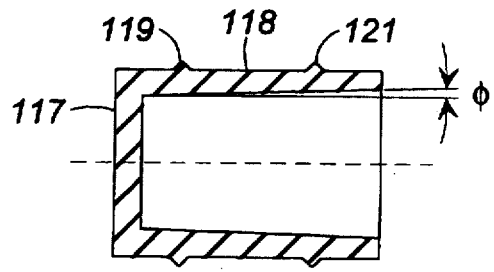
FIG. 8B  FIG. 8C

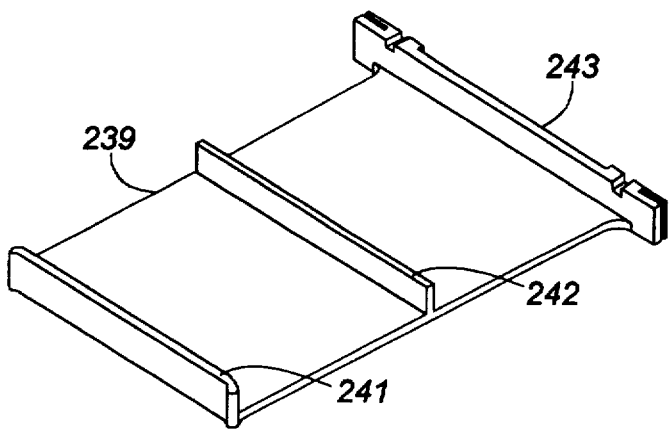
FIG. 14A
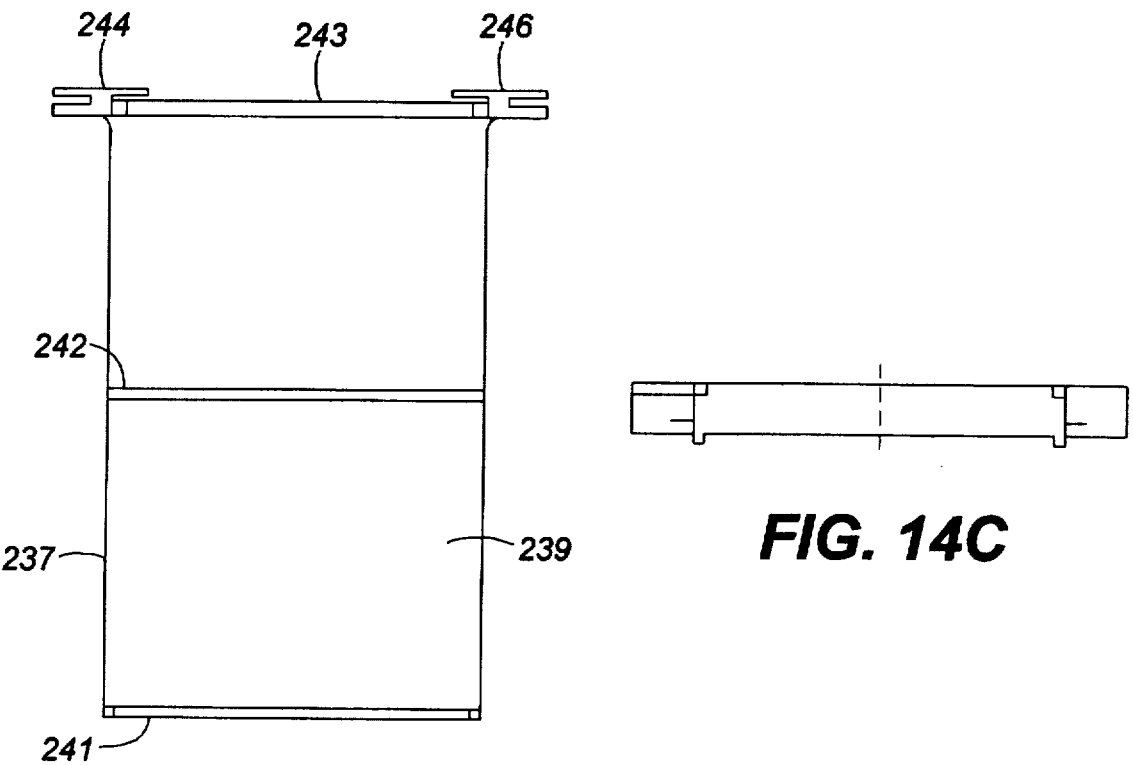
FIG. 14B
FIG. 14C
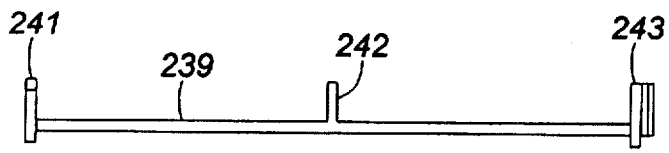
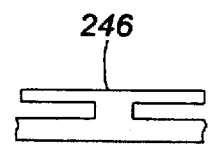
FIG. 14D     FIG. 14E

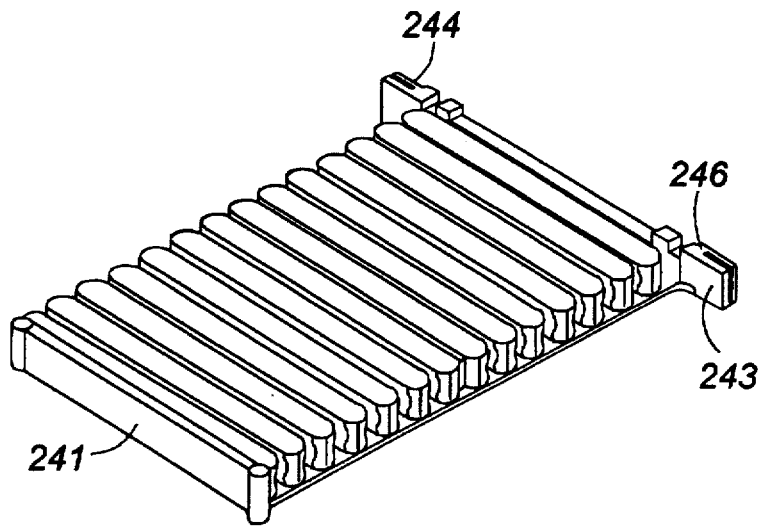
FIG. 15A
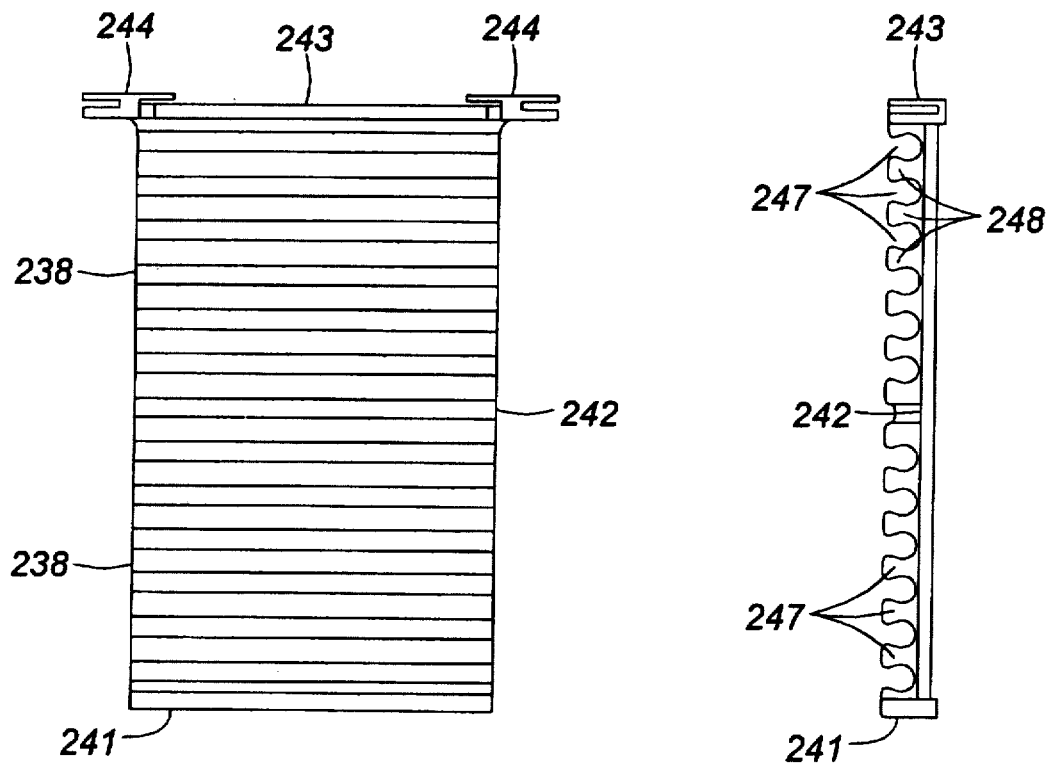
FIG. 15B  FIG. 15C

5,907,653

RACETRACK GROMMET FOR OPTICAL FIBER CABLE SPLICE CLOSURE

FIELD OF THE INVENTION

This invention relates to optical fiber cable splice closures and, more particularly, to a splice closure and components thereof which is capable of containing a large number of optical fiber splices and which is both low in cost and economical in installation and maintenance.

BACKGROUND OF THE INVENTION

Signal transmission through optical fibers has become, or is becoming, the dominant signal transmission mode. The bandwidth characteristics of optical fibers, as well as their relative immunity to certain types of interference and contaminants make them the desirable transmission medium in high capacity trunk lines as well as in lower capacity feeder and distribution lines.

No matter what the intended end use may be, individual optical fibers generally are combined in an optical fiber cable which contains a plurality of such fibers, each of which is protected by at least one layer of coating material. In one configuration, the fibers are assembled into groups which are held together by binder ribbons or tubes to form a cable core. This is generally enclosed in a metallic or plastic tube or jacket which, in the latter case, often contains a strength member. In another configuration, the fibers are arrayed in ribbon form and the core tube contains one or more stacked ribbons.

Regardless of the cable configuration, it is usually necessary that the lengths of fiber cable be spliced at their ends to the ends of other cables, which entails splicing each of the individual fibers in a cable to a corresponding individual fiber in the second cable. To this end, there is provided a splice closure which usually comprises a protective case which contains at least one splice tray which, in turn, has a plurality of splice holders mounted thereon, into which the encased individual fiber splices are inserted and held. The cables are entrant into the case and generally are clamped to each end thereof to reduce the effects of tensile forces on the cables and on the splices. Sufficient amounts of fiber slack must be provided for in the case, such as, for example, half a meter of fiber length so that the individual fibers can be pulled clear of the case to effect the splice. The slack also serves the important function of absorbing tensile forces, thereby isolating the splices from such forces. Because of the delicate and brittle nature of individual glass fibers, they cannot be crimped or bent too sharply, i.e., bent to too small a radius of curvature, which places restraints upon slack storage. Thus, there have been numerous arrangements in the prior art addressing the problem of fiber and slack storage, as exemplified by U.S. Pat. Nos. 5,097,529 of Cobb, et al.; 4,679,896 of Krafcik, et al.; and 4,332,435 of Post.

Inasmuch as, at the splice point, the cable itself is opened up and the base fibers are exposed, the only protection afforded the fibers is provided by the closure, which can provide only one or two layers of protection from the outside environment, the requirements therefor are more stringent than for the cable, which normally provides several layers of protection. The closure must anchor the cables stored therein, and it must be capable of withstanding torsional and axial loads transmitted by the cable to the closure so that the splices are protected from these loads. The closure must also seal the inner and outer sheaths of the cables and maintain the seal integrity under extreme environmental conditions. In addition, the closure must provide adequate fiber storage for slack fiber without damaging the fibers and without increasing signal attenuation. The closure preferably should be capable of storing any type of splice, such as, for example, discrete mechanical, discrete fusion or mass mechanical, or other types while reducing forces that tend to damage the splices. Additionally, the closure should provide adequate grounding and anchoring for the metallic strength members of the cable. The closure should also be capable of accepting high fiber count cables as well as those of low fiber count.

Typically, prior art splice closures are somewhat complex, difficult to assemble, are necessarily bulky, and, in use, difficult to access. As a consequence, they are not economical when used for splicing relatively low count fiber cables, such as, for example, drop cables or CATV applications. Also, when used for low fiber count cables, the bulkiness of the closure makes it difficult to provide adequate storage room, without sacrificing accessibility. This problem of size has heretofore been addressed by simply using a large closure designed primarily for high capacity use, where feasible, or by designing special, smaller closures for low capacity use, which cannot carry or contain large numbers of fibers and splices.

In order to insure protection of the splices from moisture, it is current practice to form the closure out of two mating halves, with a grommet therebetween, and clamp them together. Cable entry is through openings in the grommet, which are usually supplied with inserts which seal the cable and in turn are sealed by the grommet. Such a grommet and insert arrangement is shown, for example, in U.S. Pat. No. 5,472,160 of Burek, et al.. In that arrangement, the grommet, which is of a resilient material suitable for moisture sealing, has, at each end thereof, first and second seal members having bores therein for receiving grommet inserts, which, in turn have bores therein for receiving the cable. The seal members are preferably split longitudinally so that the grommet inserts, with cables extending therethrough, can be inserted in the seal members and be tightly embraced thereby. When the two halves of the housing are clamped together, the cable is tightly embraced, as are the seal members, so that a watertight seal is achieved.

In usage, it has been found that such a sealing arrangement can be vulnerable to a bending or flexing of the cable adjacent the entrance to or exit from the closure, which can, in some instances break the integrity of the seal. There have been various arrangements in the prior art for correcting this effect, one such arrangement being shown in U.S. Pat. No. 5,434,945 of Burek, et al. wherein the closure is encased in a protective shell which, after assembly, is filled with an encapsulant. Such an arrangement insures that the splice closure itself is virtually certain to be moisture proof. However, access to the splices is made more difficult by the presence of the encapsulant, which must be removed to permit such access. For high fiber count cables, limited access, while undesirable, does not necessarily pose too much of a problem. However, for low fiber count cables, where frequent access may often be required, such difficulty of access is undesirable.

Cables entrant into the enclosure are preferably, and in present day usage, almost always anchored to the splice enclosure itself, to guarantee a minimum of movement of the cable within the enclosure which could unduly stress the fibers and the fiber splices. One such anchoring means, in the form of a cable grip block, is shown in the aforementioned Burek, et al. U.S. Pat. No. 5,472,160. The grip block of that patent is capable of adapting to cables of different sizes, and also provides an anchor for the cable central strength member which is a usual component of loose tube type cables. The anchoring arrangement for the central strength member requires that the strength member or members be cut to a specific length and bent upward into a slot within the grip member. The strength members are maintained within the slots against tensile forces because of their rigidity and because they are bent at a right angle. Thus, they function to help maintain the cable against shifting or movement. While this arrangement functions well, the necessity of cutting the strength members to specific lengths and of bending and threading them into the slots adds another increment of assembly time to the splice closure system.

Beyond the cable grip block, the cable is opened up, i.e., the cable jacket and/or sheaths are removed to free the individual fibers so that splicing can be effected, commonly referred to as fiber breakout. It is generally necessary, or at least desirable, that sufficient amounts of fiber slack be provided within the case, or enclosure as discussed hereinbefore, so that the individual fibers can be pulled clear of the closure for preparation of the ends for splicing and for effecting the splice. For a multifiber cable there should be, within the closure, some arrangement for positioning and storing the slack and for keeping the fibers arranged in an orderly manner. Prior art arrangements that address the problem of both splice and fiber slack storage and organization are shown in the aforementioned Cobb, et al. Krafcik, et al., U.S. Pat. No. 4,332,435 of Post, as well as in U.S. Pat. No. 5,420,957 of Burek, et al. As can be seen in these patents, a splice tray is used to hold and protect the splices themselves by means of a splice holder as well as providing space for the slack fibers to be contained without the necessity of too sharp bends. For example, a splice tray adapted to be mounted within the closure, as shown in the Burek, et al. U.S. Pat. No. 5,420,957 comprises an elongated substantially rectangular container having circular hubs at each end about which the fiber is to be wound, the radius of the hubs being greater than the critical bend radius, and a splice holder located between the hubs for containing and holding the splices. Such a tray has become a widely used component of present splice closures, and, where large members of splices are to be contained, various arrangements for stacking the trays may be provided as shown, for example, in U.S. Pat. No. 5,481,639 of Cobb, et al. In most of the aforementioned arrangements, the closure is designed to hold one or more splice trays having a specific configuration, and usually is not adaptable to accommodating splices for different kinds of fiber configurations, e.g., individual fibers or fiber ribbons. More particularly, it is generally economically unfeasible to modify a given closure to accept more than one type of tray.

Most of the prior art arrangements, as evident from the foregoing discussion, emphasize adequate storage capacity and fiber protection, with space and ease of access being secondary considerations. Certain ones of the aforementioned patents, such as the Cobb, et al. patent, make size, access, and cost important considerations, at least for some situations. However, even greater reductions in size, simplicity, and cost are needed, as well as a greater measure of versatility or adaptability coupled with a ready accessibility.

SUMMARY OF THE INVENTION

The present invention is a grommet for providing a seal between first and second flanged closure portions wherein the closure portions define at least one opening in an end of the closure for allowing ingress and/or egress of a cable. The grommet has first and second longitudinal sides that are spaced apart sufficiently to fit between the flanges of the closure portions. Transverse sections, at least one of which has an insert receiving member with a bore therethrough, join the ends of the longitudinal sides. Included are two insert members for insertion into the bore, each of which has a longitudinal bore for receiving a cable. The bore of the insert receiving member has means therein for holding the two insert members in place in a butting end-to-end relationship.

In greater detail, the closure with which the grommet of the invention can be used comprises a plastic base member having a longitudinal axis and a cover member, preferably of suitable plastic material, both of which are substantially identical from being molded in the same molds, thereby eliminating a major cost of differing dies. The base and cover, both of which are flanged, have the racetrack grommet of the invention made of, for example, polyurethane located between the flanges of the base and cover, which are clamped together by suitable means. When the base and cover are joined, they define a closure having a longitudinal axis and having openings at each end of the closure which are adapted to contain enlarged insert receiving members at the ends of the racetrack grommet. These insert receiving members are compressed between the base and cover to form a moisture and dirt proof seal therebetween, and are split longitudinally to facilitate insertion therein of cable sealing inserts. Each insert receiving member receives two sealing inserts which are butted together longitudinally in end to end relationship and which contain the fiber containing cables. Each of the inserts is split longitudinally to facilitate insertion of the cable therein and, when placed within the insert receiving members of the grommet, they are rotated preferably 180° relative to each other so that the splits therein are not aligned with each other. The use of two inserts per cable insures against unseating of the inserts as a result of external flexing force on the cable, which affect or are absorbed by the outer insert while the inner insert remains unaffected, hence sealed. In this way, external flexing forces do not destroy the integrity of the seal formed between the inserts and the grommet and between at least one of the inserts and the cable.

It will be more apparent from the following detailed description, read in conjunction with the drawings, that the racetrack grommet of the present invention is capable of providing a moisture and dirt-proof or contaminant seal of high integrity for the closure and the openings therein. The inventive aspects of the racetrack grommet and the several components thereof will be more readily understood from the following detailed description, read in conjunction with the following drawings.

DESCRIPTION OF THE DRAWINGS

FIG. 5A is an elevation view of one of the pedestals of the invention;

FIG. 5B is an elevation view of one of the pedestals of the invention rotated 90° with respect to FIG. 5A;

FIG. 5C is a cross-sectional view of the pedestal along the line I—I of FIG. 5A;

FIGS. 5D and 5E are perspective views of the pedestal of FIG. 5A;

FIG. 6A is a plan view of the racetrack grommet of the invention;

FIG. 6B is an end elevation view of the racetrack grommet of FIG. 6A;

FIG. 6C is a side elevation view of the racetrack grommet of FIG. 6A;

FIG. 6D is a cross-sectional view of the insert receiving member of the racetrack grommet along the live I—I of FIG. 6A;

FIG. 7A is an elevation view of an insert for use with the grommet of FIG. 6A;

FIG. 7B is an end elevation view of the insert of FIG. 7A;

FIG. 7C is a cross-sectional view of the insert along the live I—I of FIG. 7B;

FIG. 8A is an elevation view of a port plug for use with the grommet of FIG. 6A;

FIG. 8B is an end elevation view of the port plug along the line I—I of FIG. 8A;

FIG. 8C is a cross-sectional view of the port plug of FIG. 8A

FIG. 14A is a perspective view of an insert for use with the mass splice tray of FIG. 13A, for holding one type of splice holder;

FIG. 14B is a plan view of the insert of FIG. 14A;

FIG. 14C is an end elevation view of the insert of FIG. 14A;

FIG. 14D is a side elevation view of the insert of FIG. 14A;

FIG. 14E is a detail of one of the locating members of the insert of FIG. 14A;

FIG. 15A is a perspective view of splice holders mounted in the insert of FIG. 14A;

FIG. 15B is a plan view of the splice holders mounted in the insert of FIG. 14A;

FIG. 15C is a side elevation view of the splice holders mounted in the insert of FIG. 14A;

DETAILED DESCRIPTION

Figure 1:
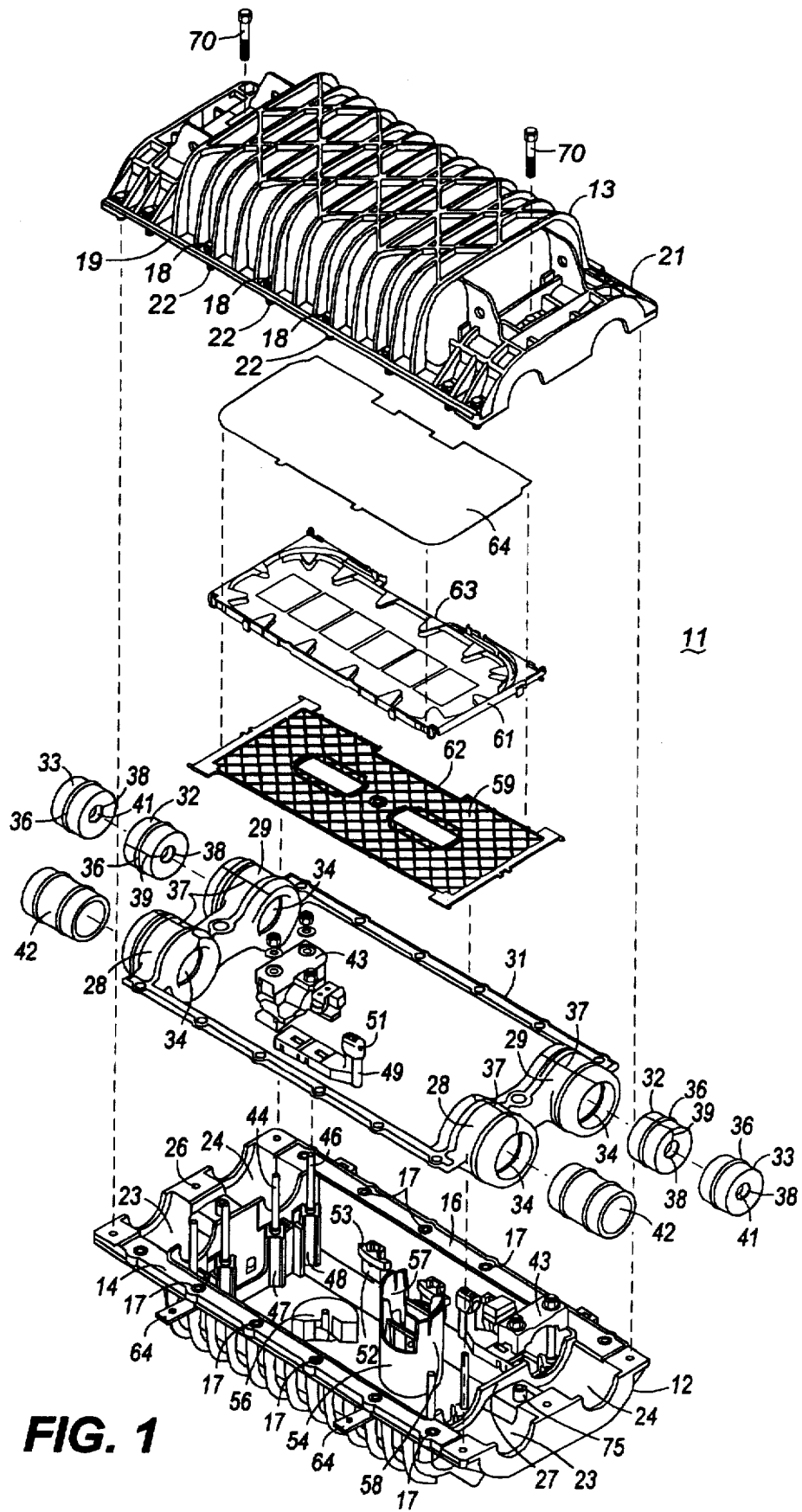
In FIG. 1 an exploded perspective view of the splice closure of the invention and its component parts.

In FIG. 1 there is shown an exploded view of the splice closure assembly 11 of the present invention, and the various component parts thereof which, when assembled, make up a complete splice closure assembly.

Closure assembly 11 comprises a base member 12 and a cover member 13 which is designed to be bolted or otherwise clamped to base member 12 after the components have been assembled with the cables, optical fibers, and splices, none of which are shown, in their assigned positions. Both base member 12 and cover member 13 are preferably made of suitable plastic material having strength and rigidity sufficient to withstand external shocks without compromising the closure integrity, or without affecting the internal components of the assembly. As a cost saving measure, both base member 12 and cover member 13 are molded or otherwise formed in substantially identical molds or dies, and are, themselves, substantially identical to each other, as will be more apparent hereinafter.

Base member 12 has a deep trough-like configuration with first and second longitudinally extending flanges 14 and 16 leaving a plurality of bolt holes 17 which match corresponding bolt holes 18 in flanges 19 and 21 of cover member 13. Bolts 22 and nuts (not shown) fit into the matching holes 17 and 18 for clamping the two members 12 and 13 together. It is, of course, to be understood that other types of external clamping means might readily be used in place of bolts 22. Side by side end compartments 23,24 are formed at each end of base member 12 by means of walls or septa 26 and 27 which have semi-circular cut-outs therein for receiving the insert receiving members 28 and 29 of a race track grommet 31, having bores therethrough for inserts 32 and 33. Grommet 31, which is made of a suitable flexible, compressible polyurethane material functions as a sealing gasket between the flanges 14 and 19 and 16 and 21 between base member 12 and cover member 13. Each of the insert receiving members 28 and 29 has a pair of longitudinally spaced V-shaped grooves 34 in the bore thereof, only one of which is visible in FIG. 1. Each of the inserts 32 and 33, both of which are preferably made of polyurethane, has a V-shaped ridge 36 around the circumference thereof which is adapted to fit within one of the grooves 34. In order that insertion of inserts 32 and 33 into receiving members 28 and 29 might be more easily accomplished, each of the receiving members 28 and 29 is split longitudinally by slits 37.

Each of the inserts 32 and 33 has a bore 38 extending therethrough for receiving the cable, not shown, which is to be spliced. As will be apparent hereinafter, each of the inserts 32 and 33 is split longitudinally by splits 39, 41 to facilitate insertion of the cable therein, and, during assembly, the slits 41 in inserts 33 should be rotated by preferably 180° relative to the slits 39 in inserts 32 so that there is no straight through path for moisture to enter the closure from the outside. The use of two inserts arrayed end-to-end in butting relationship helps avoid breaking of the moisture seal or barrier as a result of flexing of the external portion of the cable. Even under severe flexing, which might cause inserts 33 to be displaced sufficiently to break the seal between the cable and the insert 33, or between the insert 33 and receiving member 29, the inner insert 32 is not affected, and the integrity of the seal, which results from the compressive forces on the grommet 31, receiving members 29 and inserts 32 and 33 when base member 12 and cover member 13 are clamped together, is not affected. In a similar manner, the slits in both inserts 32 and 33 should be rotated relative to the slits 37 in receiving members 28 and 29.

When only one cable is to be inserted into the closure assembly 11, through, for example, receiving member 29 as shown in FIG. 1, a port plug 42 is inserted into receiving member 28 to create a moisture proof seal. Thus, both ends of the closure assembly 11 will, upon assembly, have moisture proof seals, whether one or two cables are passed therethrough.

Within the closure assembly 11, more particularly, within base member 12, is mounted a grip block assembly 43 which preferably is the same as, or similar to, the grip block assembly shown, for example, in Burek et al. U.S. Pat. No. 5,440,666. Grip block 43 is shown aligned with insert receiving member 29 and insert 32 so that the cable entrant through insert 32 passes directly into grip block assembly 43. The grip block is mounted on a pair of studs 44, 46 which, in turn, are mounted in elongated bosses 47 and 48.

A grip block 43 is shown in FIG. 1 in its mounted position adjacent compartment 24 but separated therefrom by wall 27. Grip block 43 performs the function of tightly gripping the cable entrant into the closure assembly in the manner shown and described in the aforementioned Burek et al. U.S. Pat. No. 5,440,666 so that the cable is immobilized. When the cable has a loose tube configuration having a central strength member, it is desirable that the central strength member, which is usually, but not always, a relatively stiff metallic wire member, be anchored. To this end, a central strength member anchor 49 is mounted below grip block assembly 43 and held in place thereby, and extends inwardly therefrom. Anchor 49, which will be discussed in greater detail hereinafter, has a bore 51 substantially axially aligned with the cable held by grip block 43 for receiving the central strength member of the cable, and further has means for clamping the central strength member to immobilize it and the cable still further.

Along the interior side walls of base 12 are arrayed spaced built out slots 52, only one of which is clearly shown in FIG. 1 into which cable tie retainers 53 are inserted. Cable tie retainer 53 make it possible to organize the interior of the closure assembly 11 by tying the cable or the fibers, in bunches, to the walls of the closure 11, thereby making it possible to route the fibers or cable along the walls to prevent their becoming tangled or otherwise interfering with the other components.

On the interior floor of base member 12 are mounted first and second pedestals 54 and 56, only pedestal 54 being completely shown. Pedestals 54 and 56, which will be discussed more fully hereinafter, are substantially cylindrical in shape and have, at their distal ends resilient fingers 57, 58 which are adapted to hold a splice tray adapter plate 59, thereby affording a unique mounting arrangement for one or more splice trays 61. The spaced pedestal arrangement makes it possible to store fiber slack by winding the fibers about the pedestals 54, 56, preferably in a figure eight (8) configuration, but many other configurations are possible. To this end, and to prevent too sharp bending of the fibers, the radius of the cylindrical pedestals 54, 56 is greater than the critical bend radius of the fibers. In order that the fibers may be brought from the space below, past the splice tray adapter plate 59 up to the splice tray 61 mounted thereon, plate 59 has a rectangular shaped cut-out 62 along one side, as shown, and splice tray 61 has a matching cut-out portion 63. A recessed lid 64 is provided for splice tray 61 which becomes nested into the splice tray above it when the splice trays are stacked.

In order that the closure assembly 11 may be affixed to, for example, overhead cabling, or otherwise mounted to a support structure, flange member 14 has projecting mounting tabs 64. These tabs 64, which preferably are of the same material as other fastening hardware, allow the closure to be racked in a manhole or hung on an aerial strand.

Closure Base and Cover

Figure 2A:
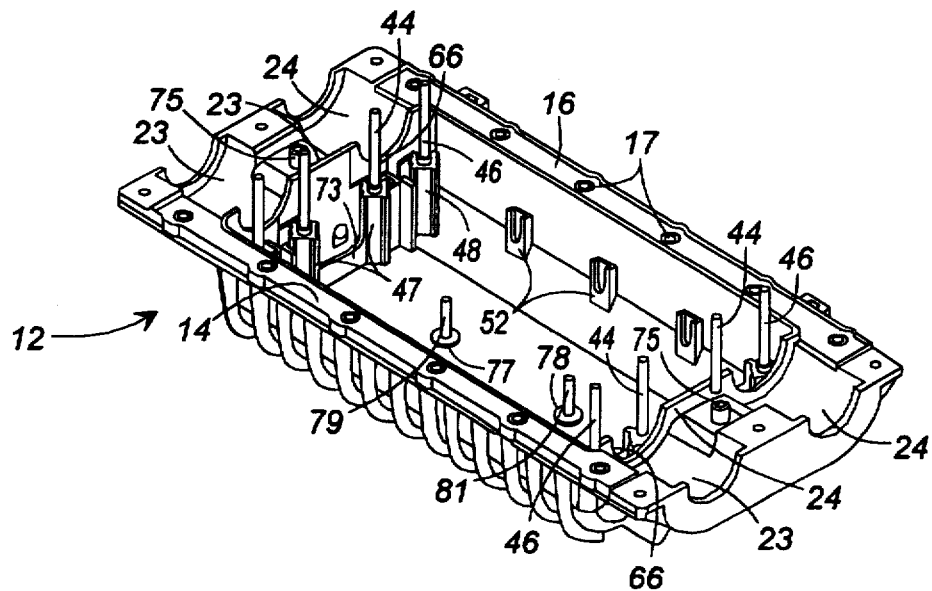
FIG. 2A is a perspective view of the splice closure base member.
Figure 2B:
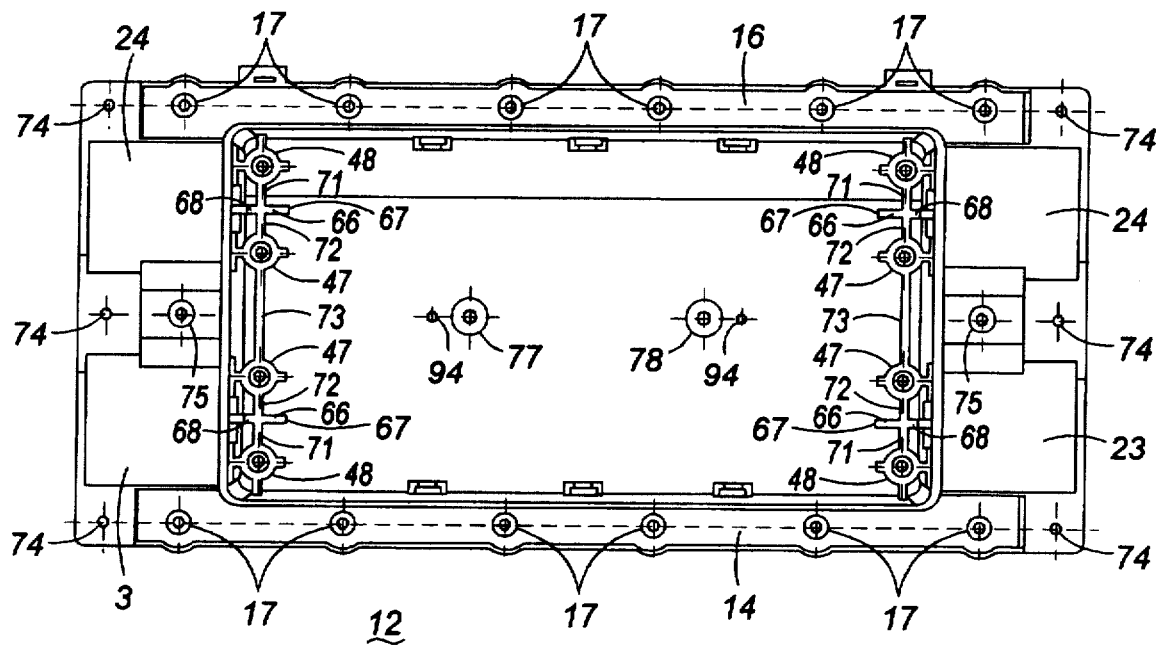
FIG. 2B is a plan view of the base number of the splice closure.
Figure 2C:
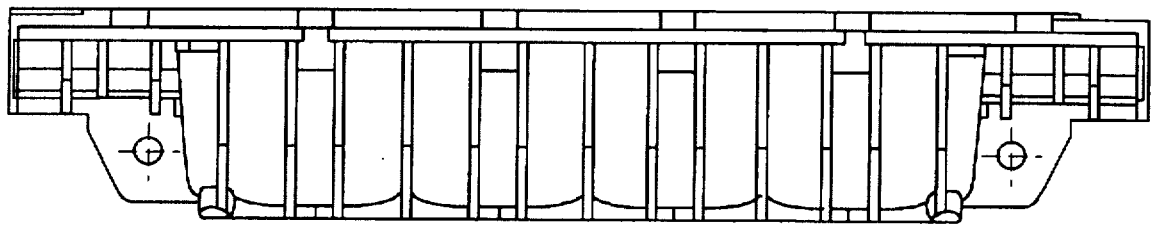
FIG. 2C is a side evaluation view of the base member of the splice closure.
Figure 2D:
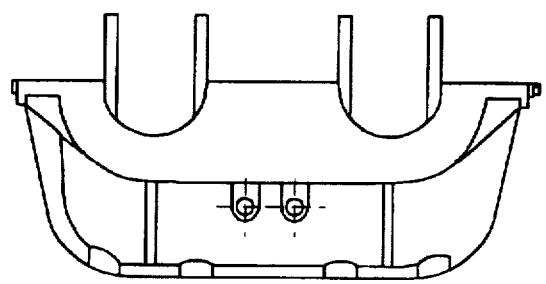
FIG. 2D is an end evaluation view of the base member of the splice closure.
Figure 3A:
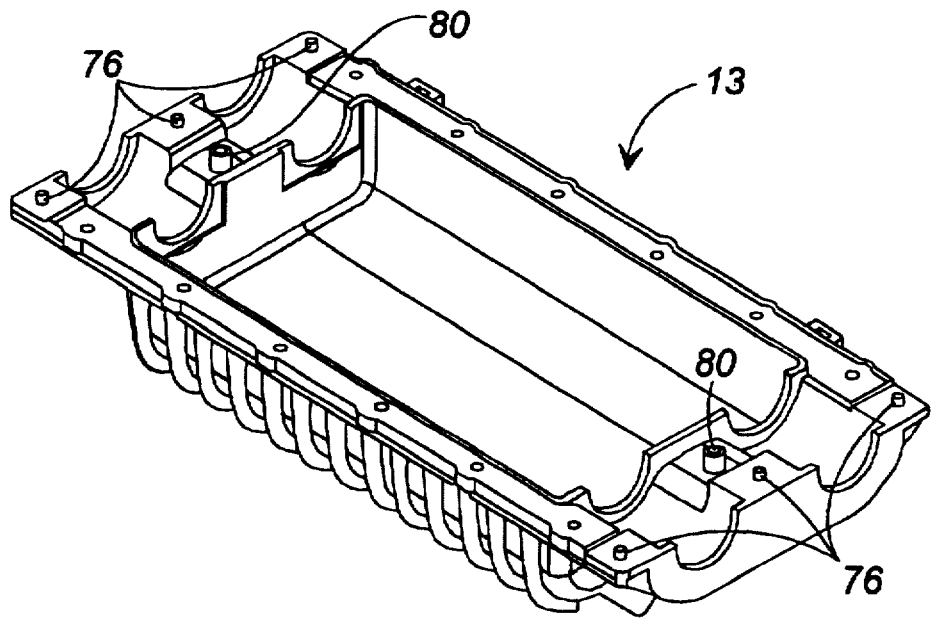
FIGS. 3A and 3B are perspective views of the cover member of the splice closure.
Figure 3B:
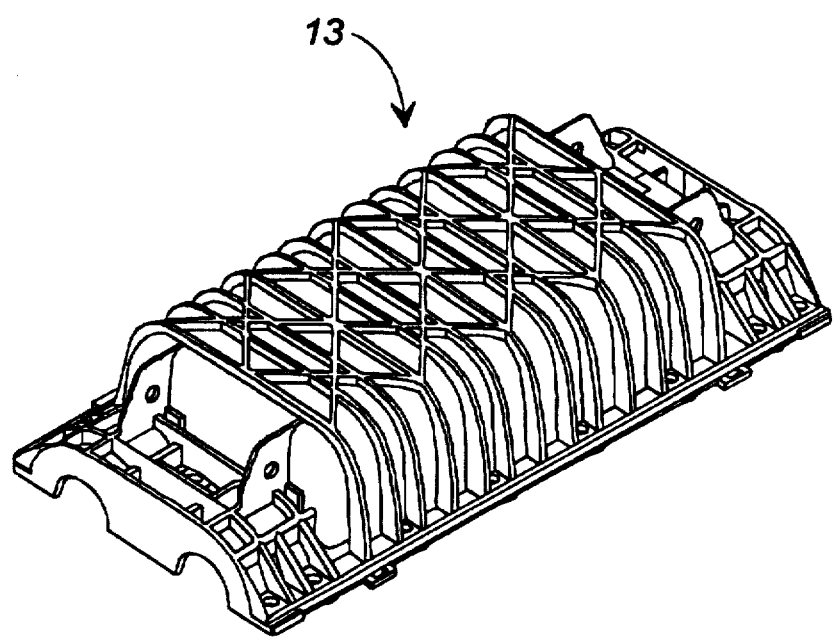
Figure 4A:
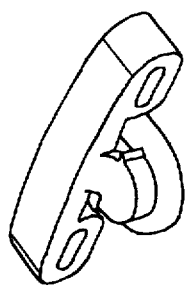
FIGS. 4A and 4B are perspective views of the cable tie retainer of the invention.
Figure 4E:
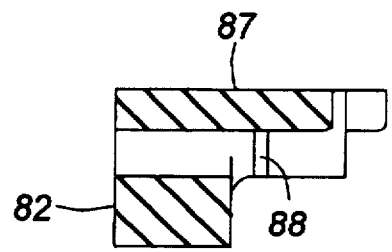
FIG. 4E is a cross-sectional view of the cable tie retainer along the live I—I of FIG. 4D
Figure 4B:
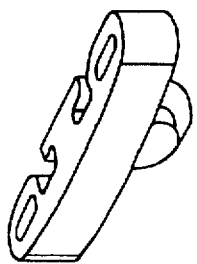
Figure 4C:
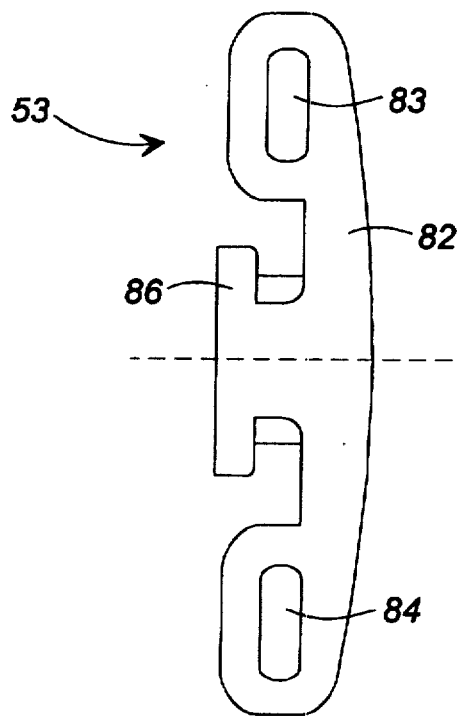
FIG. 4C is a plan view of the cable tie retainer.
Figure 4D:
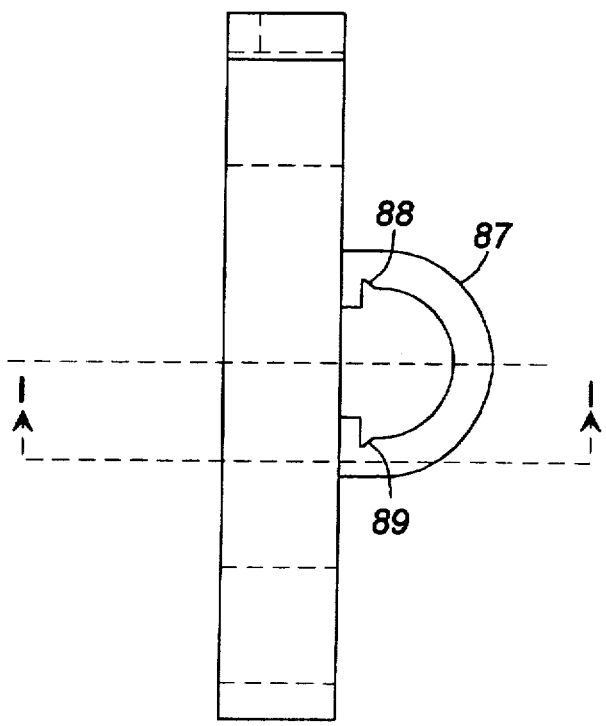
FIG. 4D is an elevation view of the cable tie retainer.

FIGS. 2A through 2D are different views of base member 12, and FIGS. 3A and 3B are two perspective views of cover member 13, which, together, form the closure shell of the assembly 11. As can be seen from those figures, both base 12 and cover 13 are substantially identical in size, shape, and conformation, and generally comprise externally ribbed (for strength) shells of suitable plastic material. The same or similar dies may be used in molding members 12 and 13, however, base member 12 has additional elements not present in cover member 13. As can be seen in comparing FIGS. 2A and 3A, base member 12 has four elongated bosses 47 and 48 arrayed thereacross at each end adjacent wall 26 and 27 on the interior side thereof. Each pair of bosses 47 and 48 are joined by a cross shaped support member 66 which has a forward or inward projecting arm 67 and a rearward projecting arm 68. Arms 67 and 68 are best seen in FIG. 2B. For reasons which will be apparent hereinafter, arm 67 is longer than, and projects above, arm 68. The cross arms 71 and 72 between each of the bosses 47 and 48 likewise are shorter than arm 67. The innermost bosses 47 are joined by a septum or wall 73 which is spaced from wall 26 as best seen in FIG. 2B. The other end of base member 12 has the same configuration of bosses 47, 48, cross-shaped support members 66 and septum 73 as best seen in FIG. 2B. Studs 44 and 46, which are threaded, are preferably affixed in elongated bosses 47 and 48, respectively, during the molding process, to create a rigid connection of the studs to base member 12.

First and second spaced bosses 77 and 78 are located on the inner floor of member 12, and threaded studs 79 and 81 are affixed therein, preferably in the same manner as the studs 44 and 46. Bosses 77 and 78 and studs 79 and 81 are preferably aligned with the longitudinal centerline of member 12, and spaced as shown. It is important that none of the studs penetrate the wall of member 12, hence the method of placing them in position during the molding process is to be preferred.

At each end of member 12 are arrayed locating holes 74 which are designed to mate with bolt locations 76 on cover member 13, as best seen in FIG. 3A. In addition, bosses 75, having bores therein, are provided at each end to receive bolts 70 shown in FIG. 1, and cover member has bosses 80 having bolt holes extending therethrough. Bosses 75 prevent over compression of grommet 31 by bearing against bosses 80.

Built out slotted members 52 are formed along the two interior side walls of member 12, in spaced array, as shown. Members 52 are adapted to receive and retain cable tie retainers 53, the configuration of each of which is best seen in FIGS. 4A through 4E. Tie retainer 53 has a roughly T-shaped configuration with the cross piece 82 having elongated bores 83 and 84 at the distal ends thereof for receiving cable (or fiber) ties. The depending portion 86 also has a roughly T-shaped configuration designed to slip within the slot formed by member 52. The leg 87 of portion 86 is curved to facilitate insertion into the slot formed by member 52, and is provided with first and second barbs 88 and 89 which, when retainer 53 is inserted fully into slotted member 52 are designed to break off within the slot, thereby insuring that retainer 53 is firmly held within member 52. As was pointed out hereinbefore, cable tie retainer 53 is useful in organizing and routing cable and fiber. The ties can be wrapped around the fiber bunch, for example, and threaded through bores 83 and 84, thereby making it possible to snug the cable or fibers close to the side walls of base member 12.

First and second pedestals 54 and 56 are identical, and their configuration is shown in FIGS. 5A through 5E. Each of the pedestals 54 and 56 is designed to be mounted to one of the studs 79 and 81 by means of a threaded bore 91 in the bottom 92 or by other suitable means, such as a nut; not shown. Each pedestal is aligned or oriented properly by means of an alignment hole 93 in the bottom 92 which mates with an alignment pin 94 on the bottom floor of member 12. Each pedestal which is of a suitable plastic material has a substantially hollow cylindrical shape, the raidus of curvature of which is greater than the critical radius for the optical fibers, and has formed at the distal end thereof, by means of slits 96 and 97, resilient fingers 57 and 58, the distal ends 98 and 99 of which have formed thereon latch projections 101 and 102 designed to mate with splice tray adapter plate 58, as will be discussed more fully hereinafter. The use of pedestals 54 and 56 for holding the splice tray adapter plate 58, and hence, the splice tray or trays above the floor of member 12 provides a substantially empty space of large volume defined by the side and end walls and the floor of member 12 for storing slack fiber. The fiber is wound in a FIG. 8 configuration or other chosen configurations previously discussed about the pedestals 54 and 56 and thus is prevented from becoming tangled or otherwise disorganized.

The cover member 13, shown in FIGS. 3A and 3B is, as has been discussed hereinbefore, adapted to fit, flange to flange with base member 12, with the racetrack grommet therebetween to provide a moisture and dirt proof seal.

The fiber closure assembly 11 including pedestals 54 and 56, splice tray adapter 59 and discrete splice tray 61 are the basis of U.S. patent application Ser. No. 08/847,214, filed concurrently herewith.

Racetrack Grommet and Inserts

Racetrack grommet 31, which is shown in detail in FIGS. 6A through 6D comprises a substantially rectangularly shaped member 103 of suitable flexible, resilient material, preferably polyurethane, having longitudinal sides 104 and 106 which are spaced apart a distance such that they fit between the flanges 14 and 16 on base 12 and 19 and 21 on cover member 13 and are substantially co-extensive therewith. Also, sides 104 and 106 have a plurality of bolt holes 107 which are spaced and located to be coincident with the holes 17 and 18 in the flanges of base member 12 and cover member 13. In some cases, bolts may not be the preferred way of clamping the base and cover member together, in which case the bolt holes 107 might not be needed. An alternative clamping arrangement is shown in U.S. Pat. No. 5,434,945 of Burek et al.. At the ends of member or grommet 103 are transverse section 108 and 109, which are substantially identical, each of which comprises spaced cylindrically shaped insert receiving members 28 and 29 separated by a web 111. Web 111 has a bolt hole 112 extending therethrough which coincides with the holes in bosses 75 and 80 of base member 12 and cover member 13 respectively. The bolts 70 produce clamping along the centerline of the closure 11, thereby insuring a tight seal throughout, in conjunction with the bolts 22. Thus, any bowing or warping of either the base member 12 or cover 13 is prevented, or minimized. Each of the insert receiving members 28 and 29 has a bore 115 extending therethrough for receiving the grommet inserts 32 and 33 and a longitudinal slit 37 to facilitate insertion of the inserts therein for holding the inserts in place, as will be discussed hereinafter.

An insert 32 for a receiving member 28 or 29 which is preferably of the same material is shown in FIGS. 7A, 7B, and 7C and comprises a cylindrical body 113 having a cable receiving bore 38 extending therethrough. Within bore 38 are a plurality of flexible sealing flanges or fingers 114, which are, as best seen in FIG. 7C, preferably sloped toward the cable entrance end of insert 32, and body 113 has a longitudinal slit 116 therein. In practice, when a cable is to be inserted into bore 38, the insert is spread apart at the slit 116 and the cable is forced into bore 38 past the sealing fingers 114. After cable insertion, and insertion of insert 32 into receiving member 28 or 29, the fingers 114 are compressed to produce a tight seal against the cable outer jacket.

The outer surface of body 113 has a V-shaped circumferential ridge 36 which nests in V-shaped groove 34 in insert receiving member 28 or 29 to hold it in place longitudinally, and, incidentally, to form a moisture block. As was discussed hereinbefore, each of receiving members 28 and 29 is dimensioned and configured to hold two inserts 32 and 33, which are identical, in butting or back to back relationship. Thus, the spacing between the V-shaped grooves 34 is approximately equal to the length of an insert 32 when the V-shaped ridges 36 are centrally located on insert 32, as shown. As pointed out hereinbefore, it is desirable that the slit 116 in one insert 32 be rotated, preferably 180°, to a different orientation than the slit 116 in abutting insert 33, thereby avoiding a direct moisture path into the interior of the closure assembly 11.

When assembly of the closure 11 is complete, the compression forces on the resilient grommet 31, receiving members 28 and 29, and inserts 32 and 33 insure that the slits 37 and 39 cannot open. However, if a cable passing through a pair of inserts 32, 33 undergoes external flexing or twisting closely adjacent to the closure 11, the forces on the outer insert 33 might be great enough to distort it thereby possibly opening it at the slit 39 or possibly unseating it within member 28 or 29, thereby destroying the integrity of its seal. The arrangement of the present invention wherein two inserts 32, 33 are used, allows the outer insert 33 to absorb any such external forces while the inner insert 32 is not subjected thereto, and hence, its seals remain unbroken.

In use, the assembly 11 may have only one cable entrant therein, or only one cable exiting, in which case one or more of the insert receiving members 28, 29 will not require the inserts 32, 33. However, the idle receiving member 28 or 29 must be sealed off to prevent the intrusion of moisture, dirt, or other contaminants into the closure interior. To this end, there are provided one or more port plugs 42, the configuration of which is shown in FIGS. 8A, 8B, and 8C. As can be seen in the figures, plug 42, which is preferably of the same material as base 12 and cover 13 and, is in the form of a hollow cylinder having a closure end wall 117 and a side wall 118 tapered in the interior of plug 42, as best seen in FIG. 8C. In addition, the exterior surface of plug 42, which is dimensioned to fit within a receiving member 28 or 29, has first and second V-shaped ridges 119 and 121 which are spaced to coincide with V-shaped grooves 34 in receiving member 28 or 29, and dimensioned to fit snugly therein. The tapered wall 118 which is thinner at the open end than at the closed end 117, facilitates insertion of the plug 42 into member 28 or 29, with the open end toward the interior of the closure 11, and end wall 117 facing the exterior. In this manner, unused receiving members 28, 29 are sealed so that the interior of closure 11 is not affected by ambient atmospheric conditions.

The combination of the racetrack grommet 31, inserts 32, 33, and port plugs 42 insure substantially complete sealing of the interior of closure 11.

The unique principles, construction and operation of the racetrack grommet, the inserts, and the port plugs are shown as used with a particular closure design. However, it will be clear to workers in the art that these features can readily be adapted to other types of closures than the one shown.

Central Strength Member Anchor

In FIGS. 9A through 9E there are shown various views of the central strength member (CSM) anchor 49, and of an alternative embodiment 122 thereof. As was pointed out hereinbefore, anchor 49 functions as an anchor for the central strength member of, for example, a loose tube cable, without requiring precise cutting or bending of the CSM.

Anchor 49, which is preferably of a hard plastic material, comprises an elongated base portion 123, an upstanding leg 124, and a CSM receiving member 126 having a bore 127 extending therethrough for receiving the CSM of the cable. Member 126 has first and second threaded bores 128 and 129 for receiving set screws 130 and 135 which clamp down on the CSM to hold it firmly in place within bore 127. Thus, the CSM is anchored firmly within the bore 127, which functions not only to contain the CSM but also add another point of resistance against tensile forces on the cable. Base portion 123 comprises a substantially rectangularly shaped planar member 131 from which depends side walls 132 and 133. Disposed along the center line of anchor 49 are first and second rectangular holes 134 and 136 which pass completely through member 131 and which are dimensioned to fit snugly over arm 67 of support member 66 which is shown in FIG. 2B. Each of the depending walls 132 and 133 has first and second slots 137 and 138 which are dimensioned to fit down over cross arms 71 and 72 when arm 67 penetrates one of the rectangular holes 134, 136 as explained in the foregoing. Each of the side walls 132 and 133 also has a slit 139 and member 131 is transversely scored at 141, the score 141 being aligned with slits 139. Slits 139 and score 141 allow the portion of base portion 123 to be broken off so that the slots 137 are to be fitted over cross arms 71 and 72 and rectangular hole 134 fits over arm 67. If, on the other hand, it is desired to have a greater length of the cable central strength member protruding from grip block 43, the member 123 is not broken, i.e., shortened, and slots 138 and rectangular hole 136 become functional in mounting anchor 49 to base member 12. Anchor 49 is, when the closure is assembled, located under grip block 43 and held in place thereby when block 43 is mounted to the base 12. The height of arm 124 is chosen such that when anchor 49 is mounted in place, the bore 127 will be approximately aligned with the axis of the cable held in grip block 43 so that it will not be necessary to bend the cable central strength member in order to anchor it. Further, the use of an elongated base portion 123 with the scoring 141 and the slits 139 in side walls 132 and 133 makes possible a wider range of CSM lengths, thereby minimizing the restraints on cutting the CSM to a proper length. The anchor 49, which is a separate entity from grip block 43, makes possible a simple and quick anchoring of the CSM.

Figure 9A:
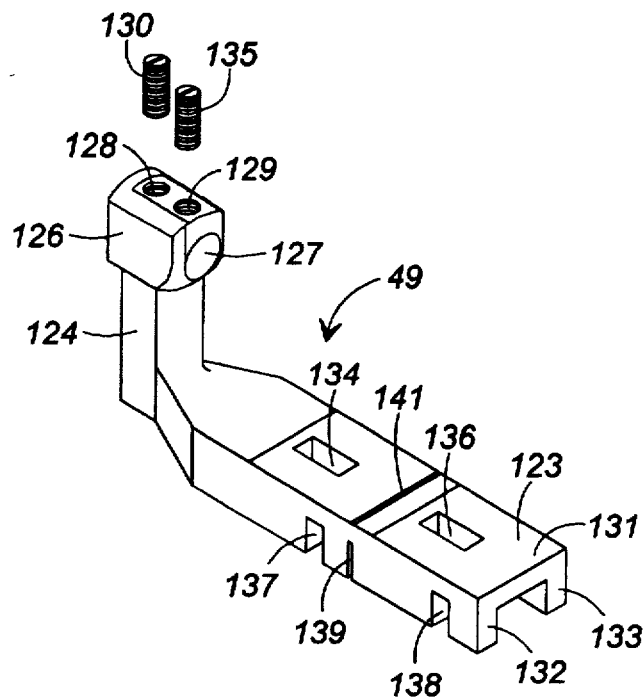
FIG. 9A is a perspective view of the central strength member (CSM) anchor of the present invention.
Figure 9B:
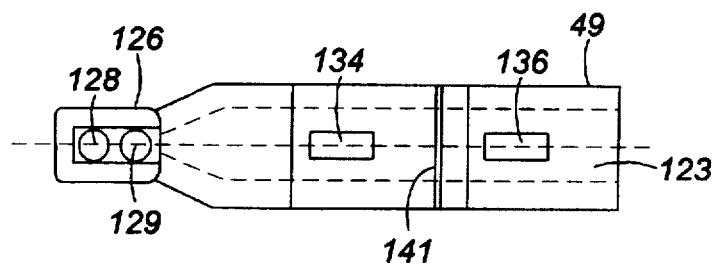
FIG. 9B is a plan view of the CSM anchor of FIG. 9A.
Figure 9C:
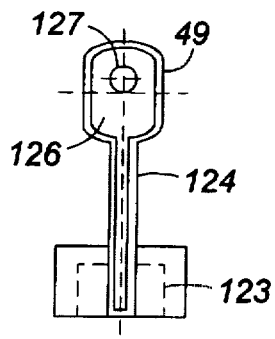
FIG. 9C is an end evaluation view of the CSM anchor of FIG. 9A.
Figure 9D:
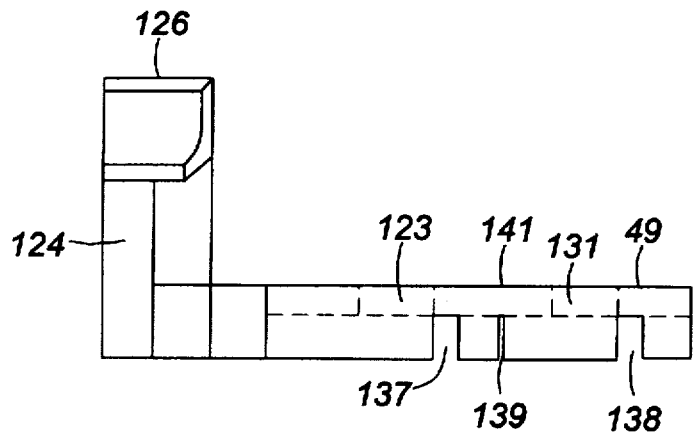
FIG. 9D is a side evaluation view of the CSM anchor of FIG. 9A.
Figure 9E:
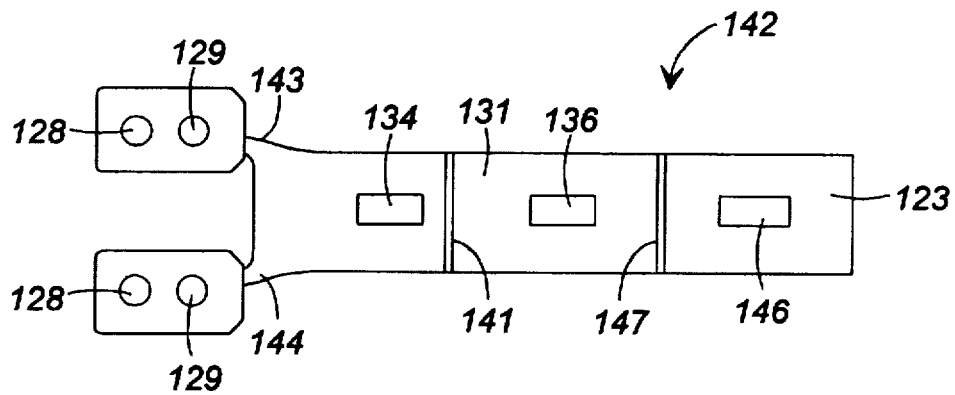
FIG. 9E is a plan view of an alternative configuration of the CSM anchor.
Figure 9F:
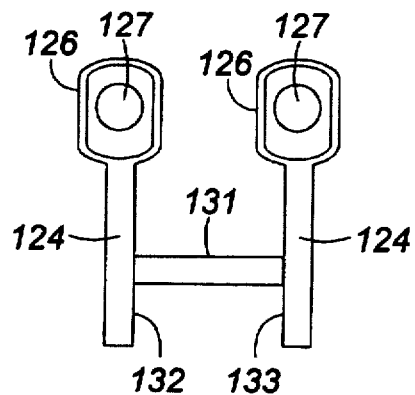
FIG. 9F is an end elevation view of the CSM anchor of FIG. 9E.
Figure 10A:
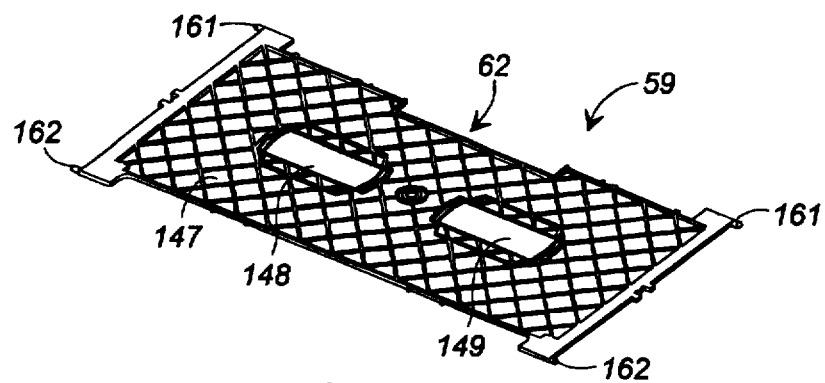
FIG. 10A is a perspective view of the splice tray adapter plate of the invention.
Figure 10B:
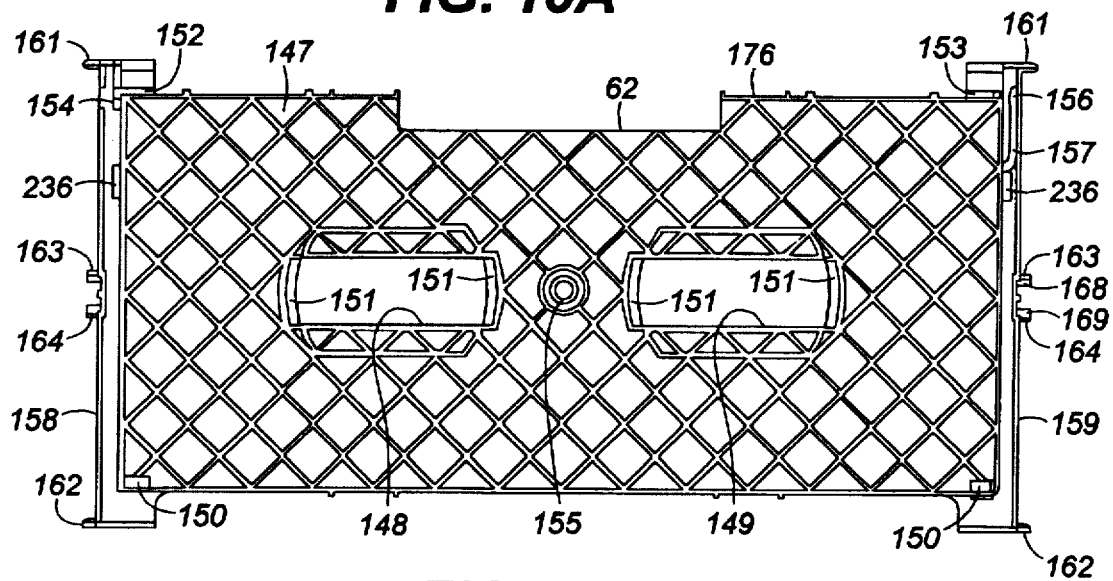
FIG. 10B is a plan view of one side of the splice tray adapter plate of FIG. 10A.
Figure 10C:
FIG. 10C is a side elevation view of the splice tray adapter of FIG. 10A.
Figure 10D:
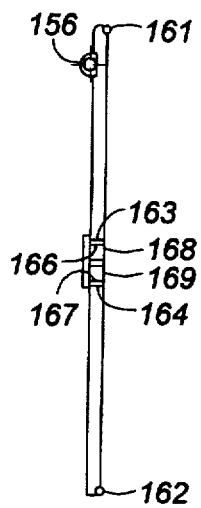
FIG. 10D is an end elevation view of the splice tray adapter plate of FIG. 10A.

FIGS. 9E and 9F depict a modification of the anchor member 49 which is capable of gripping two CSM's. For simplicity, like parts to those in FIGS. 9A, 9B, 9C, and 9D, bear the same reference numerals. The anchor member 142 comprises a base portion 123 which comprises a planar member 131 and copending side walls 132 and 133. However, one end of planar member 131 is bifurcated to form two arms 143 and 144, each one of which terminates in an upstanding leg 124 having a CSM receiving member 126 on the distal end thereof. Member 123 is shown with a third rectangular hole 146 and a second scoring 147 on the surface of planar member 131, thereby allowing greater flexibility in anchor length. Such an anchor member is especially useful in those closure assemblies where the grip block 43 or an equivalent cable gripping member is designed to accommodate two cables. The spacing of the two CSM receiving members 126 are chosen to be such that they are approximately aligned with the cable axes, thereby eliminating the necessity of precisely bending the cable CMS's.

The CSM anchor as shown and described herein greatly simplifies the assembly of the closure with cables entrant therein. Where, as is possible in the case of the assembly shown in FIG. 1, four cables are entrant into the closure, four CSM anchors 49 would be used. On the other hand, some closure configurations can accommodate greater numbers of cables, in which case, anchor 142 would be used, or, in some arrangements, a combination of anchors 49 and 142 can be used. The mounting arrangement for both anchors 49 and 142 are for the particular closure 11 as shown in FIG. 1. It will be apparent that other mounting arrangements for the anchor 49 and 142 might be used, depending upon the particular closure configuration. The unique CSM anchor as depicted and described herein is the basis for U.S. patent application Ser. No. 08/846,409 of Burek et al.

Splice Tray Adapter Plate

In FIGS. 10A through 10D there is shown in greater detail the splice tray adapter plate 59 which mounts upon the tops or distal ends of the pedestals 54 and 56. As was discussed in the foregoing, and as will be readily apparent hereinafter, adapter plate 59 can accommodate two standard splice trays of the type shown in the aforementioned Burek et al. U.S. Pat. No. 5,420,957, or more than two when the trays are stacked, as well as one or more stacked discrete splice trays 61 or mass splice trays.

Adapter plate 59 comprise a thin rectangular plate 147 of suitable material, preferably a hard plastic, which is preferably ribbed, as shown, for added stiffness and resistance to warping or bowing. First and second spaced openings 148 and 149, substantially rectangular in shape but having curved ends are oriented as shown along the centerline of member 147. The spacing between openings 148 and 149 corresponds or is equal to the spacing between pedestals 54 and 56, and each opening 149 and 149 has, at each end thereof, a projecting lip 151 which is adapted to be engaged by one of the latch projections 101 or 102 on the distal ends of resilient fingers 57 or 58 of the pedestals 54 and 56. In this manner, plate 59 can be mounted on and removably affixed to the pedestals 54 and 56. At two of the corners 152 and 153 of the plate member 147 are pivot pin receiving bushings 154 and 156 which receive pivot pins on the splice tray 61 or other splice trays, as will be apparent hereinafter. Bushing 154 is, preferably, fixed in place at corner 152 while bushing 156 forms the end of a resilient finger 157 which extends from the side of plate member 147 toward corner 153. Thus, in mounting a splice tray to adapter plate 59, finger 157 can be flexed to permit easy insertion of a splice tray pivot pin therein. At each end of plate member 147 is a flange member 158 or 159, and at each end of each flange member are pivot pins 161 and 162, which are also used in mounting a splice tray on plate 59. At the other two corners of rectangular plate 147 are latch holes 150 for latching a mounted splice tray, such as tray 61, to adapter plate 59.

Figure 11:
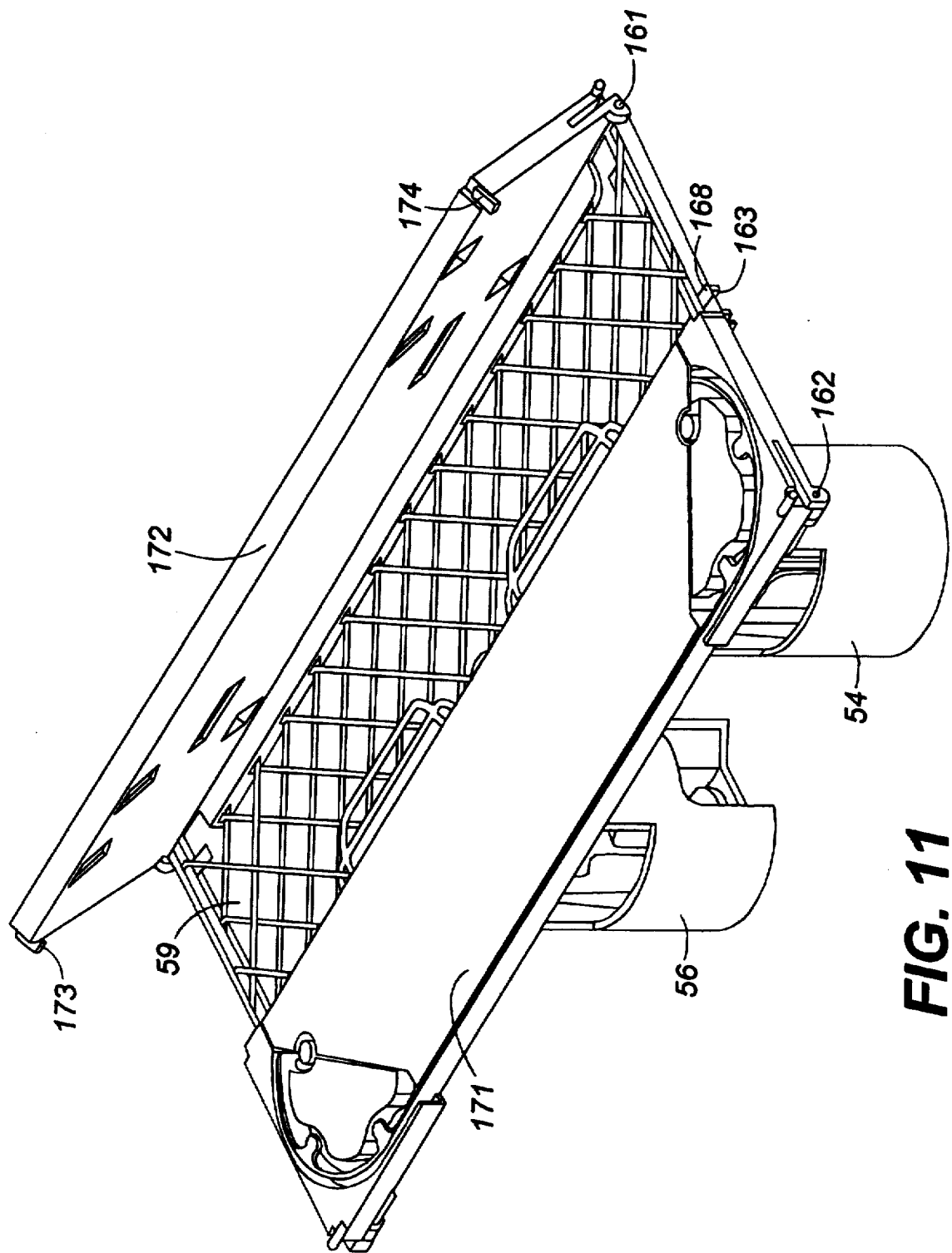
FIG. 11 is a perspective view of the splice tray adapter plate mounted on the pedestals, illustrating how one side thereof accommodates two standard (UCB) splice frays.

Extending from flanges 158 and 159 and located substantially centrally between pins 161 and 162 are first and second L-shaped latch members 163 and 164. As viewed in FIG. 10B and 10D, the legs 166, 167 of members 163 and 164 extend across the thickness of flanges 158 and 159, while the projecting arms 168 and 169 are aligned with the bottom thereof. As will be apparent hereinafter, when either the discrete splice tray 61 or the mass splice tray for use with plate 59 is mounted, latch members 163 and 164 play no part in affixing such splice tray to adapter plate 59. However, when standard or UCB splice trays are to be mounted, the adapter plate is inverted so that arms 168 and 169 are aligned with the top of flanges 158 and 159, and latch members 163 and 164 act to latch the splice trays in place. This is illustrated in FIG. 11, which depicts adapter plate 59, mounted on pedestals 54 and 56 in its inverted position where the L-shaped latch members 163 and 164 (only 163 being shown) are in their inverted position, with the arm 168 being at the top of the inverted L. First and second UCB type splice trays 171 and 172 are mounted on the pivot pins 161 and 162, and resilient latches 173 and 174 on each splice tray engage the arms 168 and 169 of latch members 163 and 164. Thus, adapter plate 59 can accommodate two splice trays 171 and 172 on a single level, and the splice trays may be stacked in accordance with present practice.

Figure 12A:
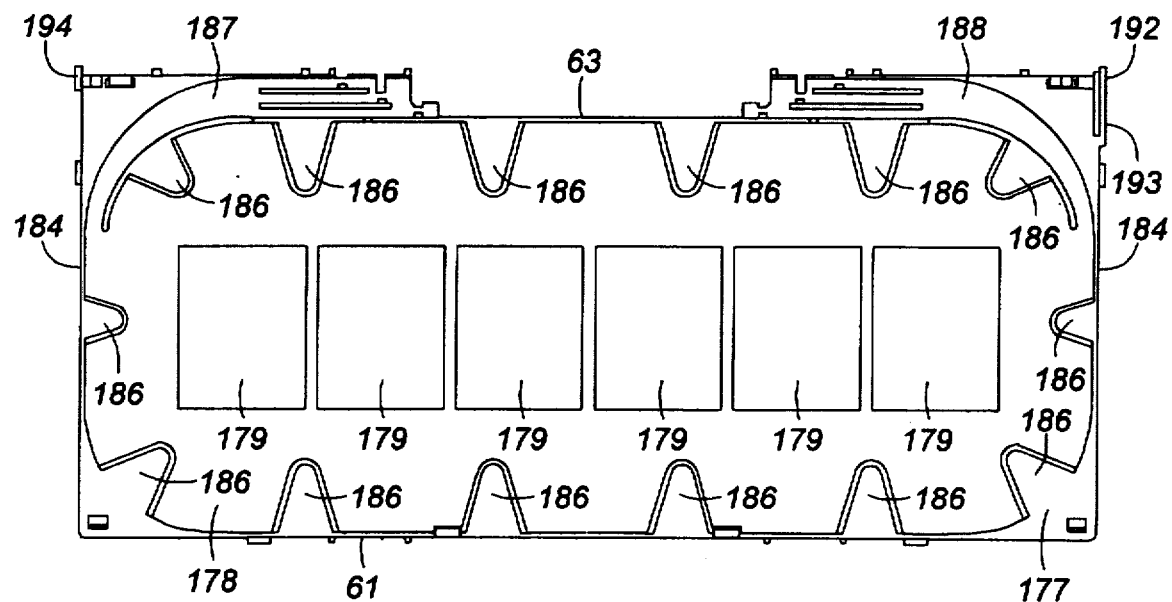
FIG. 12A is a plan view of a discrete splice tray for use with the invention.
Figure 12B:
FIG. 12B is a side elevation view of the discrete splice tray of FIG. 12A.
Figure 12C:
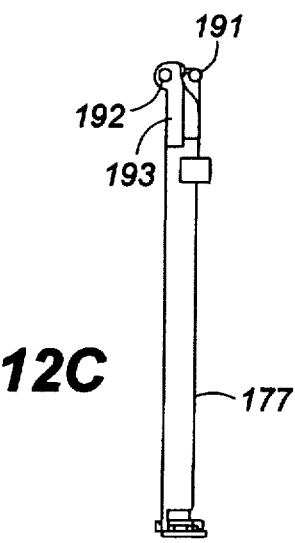
FIG. 12C is an end elevation view of the discrete splice tray of FIG. 12A.
Figure 12D:
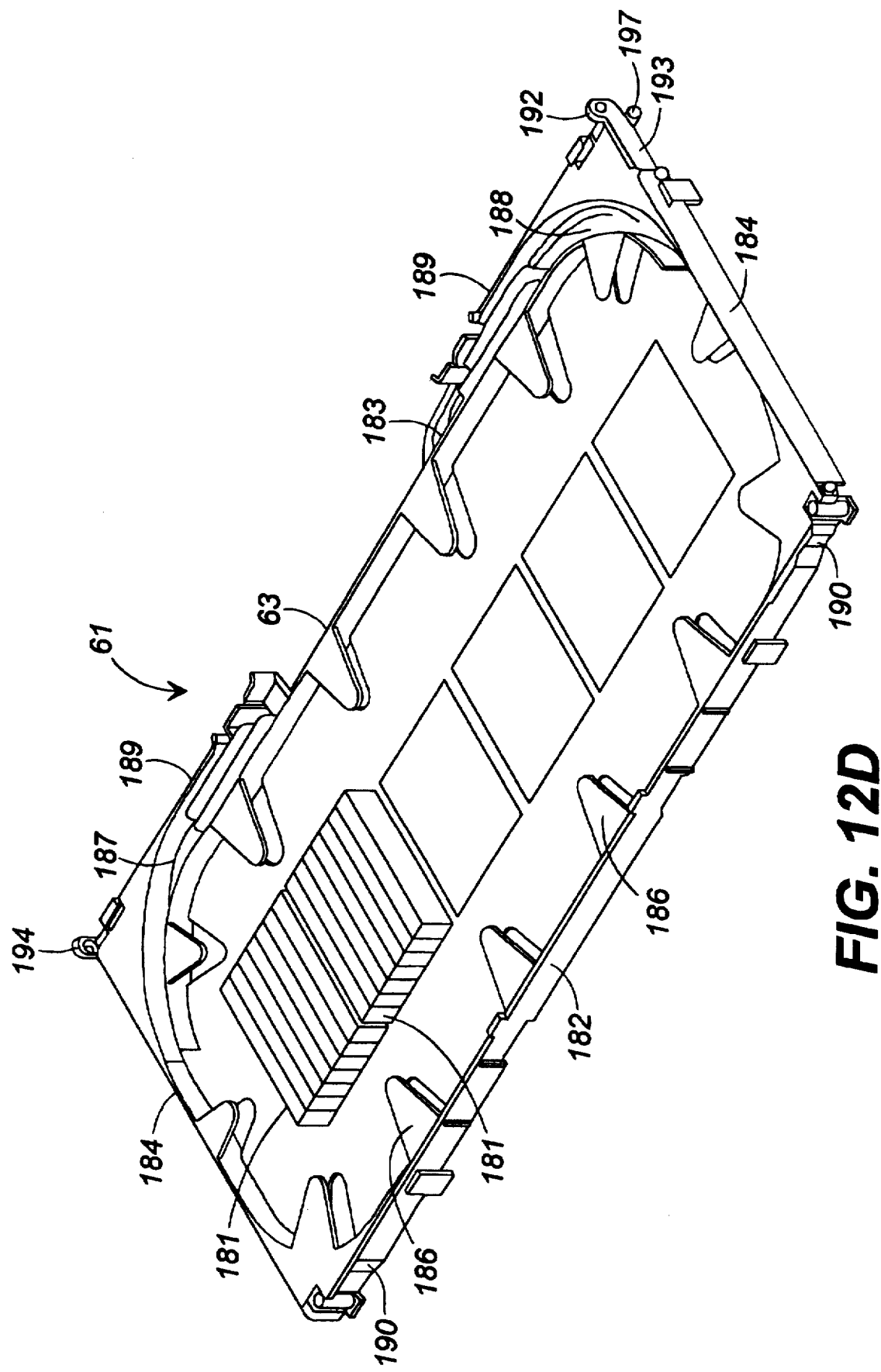
FIG. 12D is a perspective view of the discrete splice tray of FIG. 12A.

One elongated side 176 is provided with a cut-out portion 62 which forms passage for the fibers to be spliced from below the adapter plate 59 to the splice trays, as shown in FIG. 12D.

Plate 59 also has a centrally located bore 155 therein which is useful for mounting bolt or stud mounting splice trays thereto.

Discrete Splice Tray

The discrete fiber splice tray 61 for use with adapter plate 59 in closure 11 is shown in detail in FIGS. 12A through 12D. Tray 61 comprises a base member 177 of suitable rigid plastic material having a floor 178 along which are arrayed a plurality of splice holder regions 179 upon which splice holder 181, shown diagrammatically in FIG. 12D are to be affixed, as by adhesive. The splice holders 181 as depicted in FIG. 12D are for illustrative purposes only, the actual splice holders having more slots for splices than are shown, and being configured for different types of splices. Extending upwardly from the peripheral edges of floor 178 are front, rear, and side walls 182, 183, and 184, respectively. The designation "front" and "rear" are only applicable to the view of the splice tray shown in FIGS. 1 and 12D, there being no actual "front" and "rear". Extending from the top edges of walls 182, 183, and 184 are a plurality of protective tabs 186 which function to hold the fibers within the confines of the walls by preventing them from bulging or bending upward, as best seen in FIG. 12D. Tray 61 also has a recess opening 63 which, when tray 61 is mounted on adapter plate 59 on the obverse side thereof, coincides with opening 62 in plate 59 to allow fiber to be fed to the tray from below adapter plate 59. First and second channels 187 and 188 are open to the recess opening 63 and function to route the fibers into the confines of the walls 182, 183, and 184. Because the fiber slack is stored below the adapter plate, as discussed in the foregoing, it is not necessary that the splice tray 61 have hubs at each end, as is typical of the UCB tray and most other in the prior art. This represents a substantial savings in fabrication, since the dies or molds for the tray 61 are much simpler and correspondingly, less costly than those for prior art trays.

Located at the corners formed by side walls 184 and the walls 189 forming channels 187 and 188 are pivot pins 191 which are designed to fit within pivot pin bushings 154 and 156 on adapter plate 59, thereby pivotally mounting splice tray 61 to plate 59. As pivot pin bushing 192 formed on the distal end of a flexible finger 193 is located immediately above the other pivot pin 191. Bushings 192 and 194 are adapted to receive the pivot pins of a second splice tray (not shown) in the event that it is necessary or desirable to stack several splice trays 61. Splice tray 61 is provided with a recessed cover 64, as shown in FIG. 1, which is used with every tray in a stack. At the other two corners of tray 61 are resilient latching fingers 190 whose distal ends have lipped latches 195 which are designed to mate with latch holes 150 in adapter plate 59 to hold tray 61 securely in place.

As can best be realized from FIG. 12D, the discrete splice tray 61 can contain a large number of discrete splices contained in holders 181, and only that portion of the fibers themselves contained therein is that required to accommodate the splices, without any additional slack storage.

Mass Splice Tray

The closure assembly 11, as pointed out in the foregoing, is, through its unique combination of pedestals 54 and 56 and adapter plate 59, capable of accommodating several different types of splice trays while providing large amounts of fiber storage space. In addition to its ability to organize optical fibers and fiber slack, it is also equally capable of organizing and storing or containing optical fiber ribbon structures and slack ribbon. Inasmuch as optical fiber ribbons contain large numbers, e.g., twelve, fibers therein, it is desirable that additional slack containment be provided to facilitate splicing of the fibers within the ribbon.

In FIGS. 13A through 13G there is depicted a mass splice tray 196, of suitable material such as thin, hard plastic, which is designed primarily to contain optical fiber ribbon splices of differing types while, at the same time, storing ribbon slack without creating two sharp bends in the ribbons.

Figure 13A:
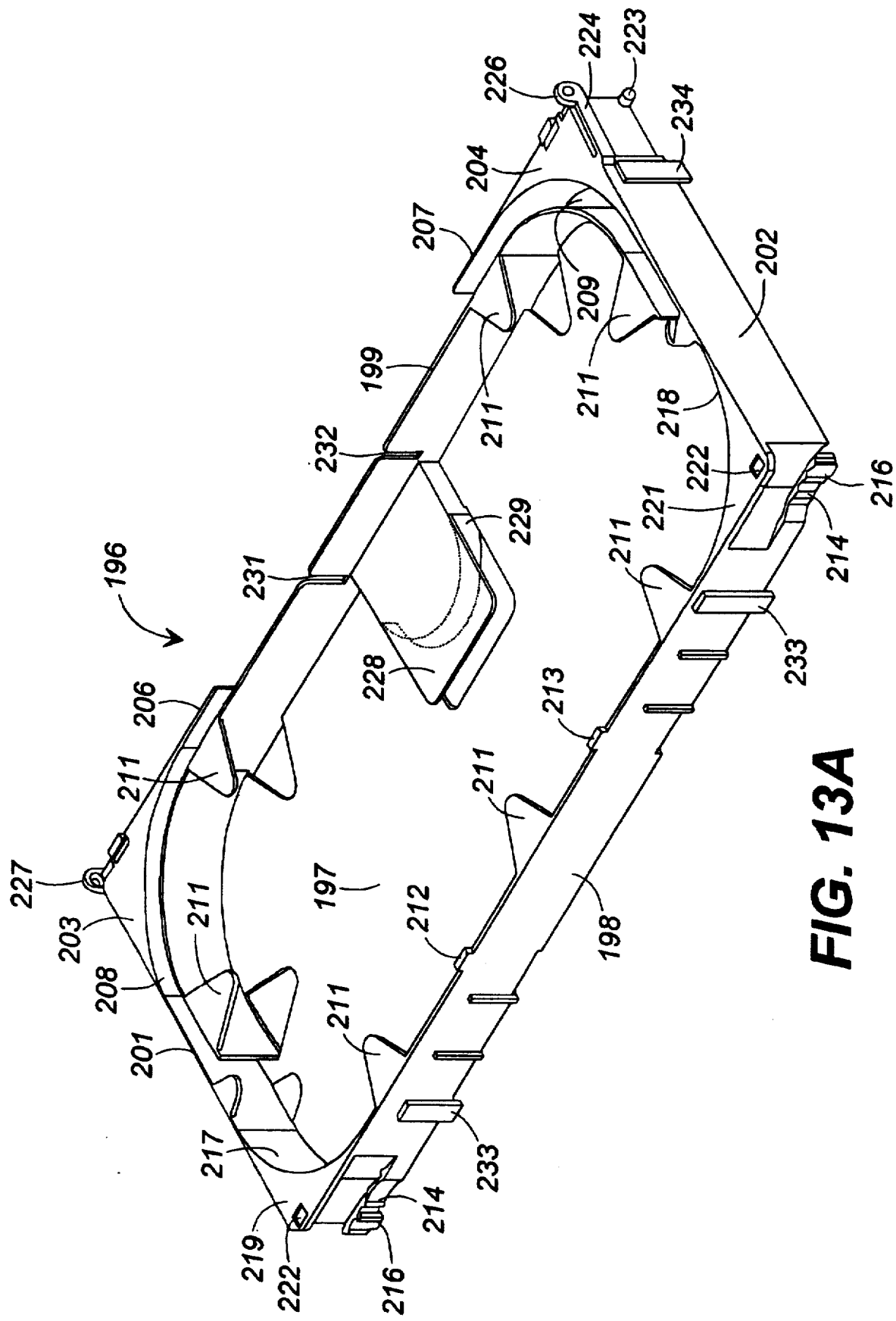
FIG. 13A is a perspective view of the mass splice tray of the invention.
Figure 13B:
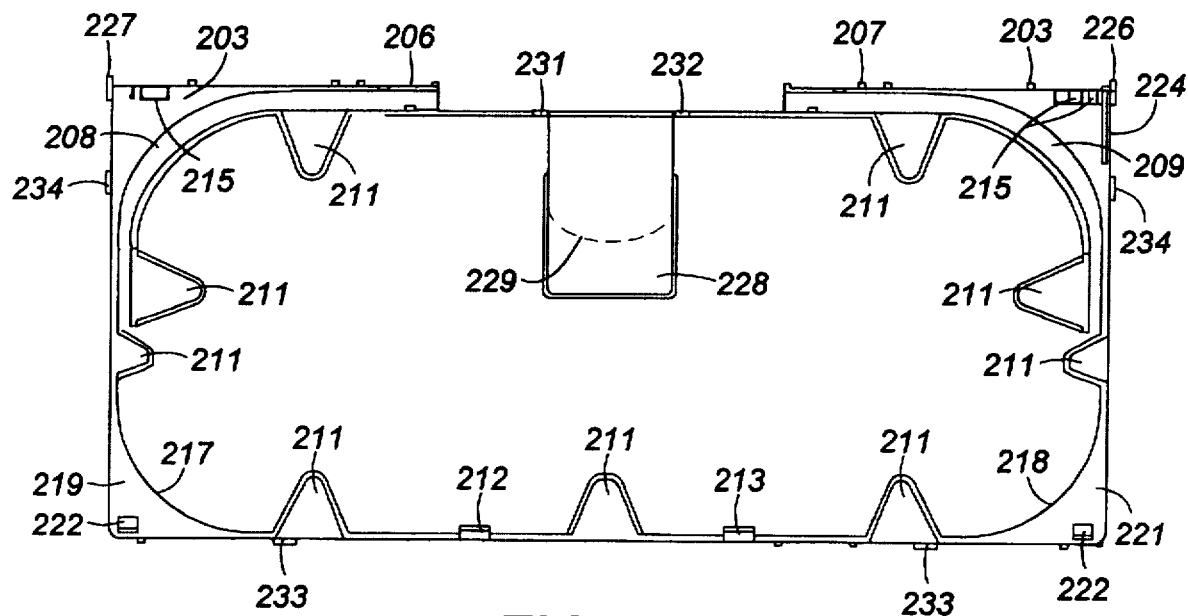
FIG. 13B is a plan view of the mass splice tray of FIG. 13A.
Figure 13C:
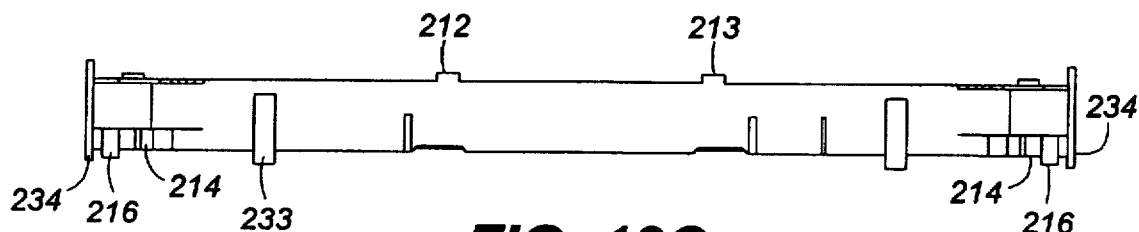
FIG. 13C is a side elevation view of the mass splice tray of FIG. 13A.
Figure 13D:
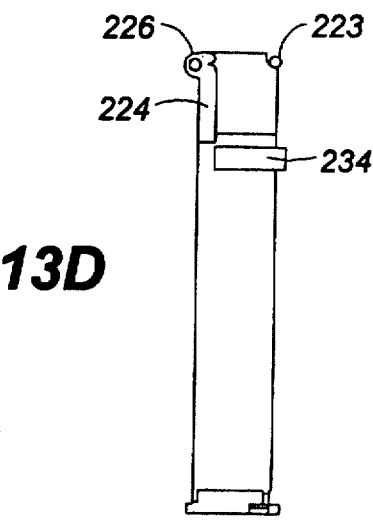
FIG. 13D is an end elevation view of the mass splice tray of FIG. 13A.
Figure 16A:
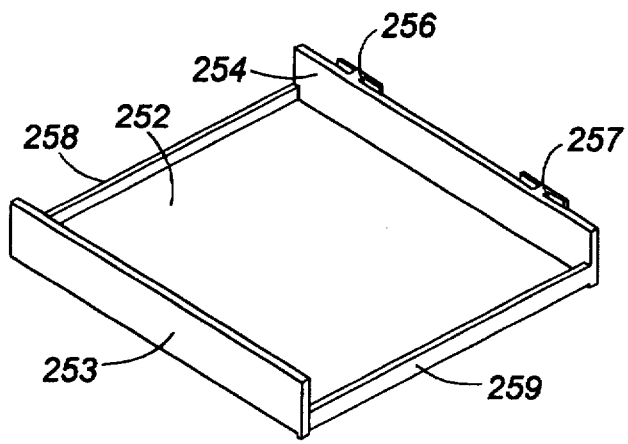
FIG. 16A is a perspective view of another form of insert for use with the mass splice tray of FIG. 13A.
Figure 16B:
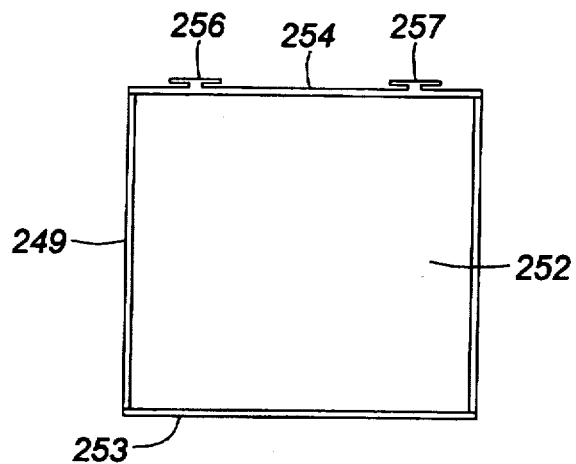
FIG. 16B is a plan view of the insert of FIG. 16A.
Figure 16C:
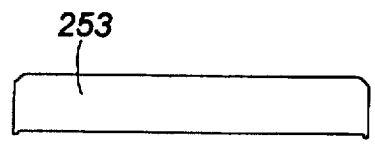
FIG. 16C is an end elevation view of the insert of FIG. 16A.
Figure 16D:
FIG. 16D is a side elevation view of the insert of FIG. 16A.
Figure 16E:
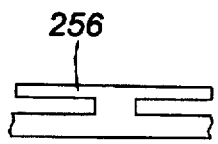
FIG. 16E is detail of one of the locating members of the insert of the insert of FIG. 16A.

As best seen in FIG. 13A, tray 196 comprises a planar floor member 197 of substantially rectangular shape having a front wall 198, a rear wall 199, and first and second end walls 201 and 202. It can be seen that the walls are substantially higher than the side and end walls of the discrete splice tray 61. The terms "front" and "rear" refer only to the positions of walls 198 and 199 as viewed in FIG. 13A. End walls 201 and 202 have extensions 203 and 204, respectively, from which project walls 206 and 207 which form channels 208 and 209 for routing the fiber ribbons from below the adapter plate 59 to the interior of tray 196, as defined by the walls thereof. Protective tabs 211 extend from the upper edges of the several walls to prevent the fibers or ribbons from bulging or bending upward, thereby maintaining them below the top edges of the walls of the tray 196. The top edge of front wall 198 has first and second spaced latch projection 212 and 213 which, as will be apparent hereinafter, function to hold a cover member in place. At the rear corners of extensions 203 and 204 are similar projections 215 which also function to hold the cover member in place. At either end of front wall 198, at the bottom thereof, is a resilient finger 214, the distal end Which has a projecting latch member 216 adapted to mate with the openings 150 in adapter plate 59 to affix the splice tray 196 into place on plate 59. At the intersections of end walls 201 and 202 with front wall 198 are first and second curved sections 217 and 218, which have extending flanges 219 and 221, each have a hole 222 at the corner thereof which is adapted to receive the latch members 216 on a second splice tray when the trays are stacked for additional capacity. At the lower corner of each of extensions 203 and 204 is a projecting pivot pin 223 which is designed to fit within one of the bushings 154 or 156 on adapter plate 59. On extension 204 is formed a resilient finger 224 which has, at its distal end, a pivot pin bushing 226, located directly above pivot pin 223. Also, on extension 203 there is formed a pivot pin bushing 227. Bushings 226 and 227 are adapted to receive the pivot pins 223 of a second tray that is stacked upon the tray 196 so that it is pivotable with respect thereto, and pins 223 on tray 196 serve to mount it pivotably to adapter plate 59.

Extending from rear wall 199, and approximately centrally located with respect thereto is a splice holder support shelf 228 which is spaced from floor 197 and supported in part by a curved support member 229. Rear wall 199 has first and second slots 231 and 232 which are spaced apart a distance approximately the width of support shelf 228 and are aligned with the extending sides thereof, and which extend from the top edge of wall 199 approximately to the top surface of shelf 228, as best seen in FIG. 13A. Shelf 228 is designed to support any one of a number of types of splice holders, as will be apparent hereinafter, and slots 231 and 232 function to position the splice holders relative to the shelf 228.

The front wall 198 has depending therefrom spaced locating tabs 233 which are adapted to bear against the front edge of adapter plate 59, thereby locating tray 196 relative to the plate 59. End walls 201 and 202 each have a depending tab 234 which are adapted to fit within locating holes 236 in adapter plate 59, the further to assist in locating tray 196 on plate 59.

In FIGS. 14A through 14E there are shown several views of a splice holder insert 237 for mounting a splice holder with foam material for cushioning the splices, as shown in FIGS. 15A through 15C, onto mass splice tray 196. Insert 237, which is preferably made of a hard plastic material, comprises a floor member 239 having a front wall 241, an intermediate wall 242, and a rear wall 243, which is, as shown in the figures, wider than the floor 237 and walls, each of which is approximately as wide as the support shelf 228. Extending from the rear of wall 243 are first and second T-shaped locating members 244 and 246, with the legs of the T-shapes being spaced apart a distance equal to the spacing of the locating slots 231 and 232. The leg of member 244 is adapted to slip into slot 231, and the leg of member 246 into slot 246 so that insert 237 can be lowered onto shelf 229 and be held thereby members 244 and 246 in the slots 231 and 232 respectively. As shown in FIGS. 15A through 15C, two fusion splice holders 238 can be fitted onto insert 237, and held in place by, for example, suitable adhesive means, not shown, such as a double sided adhesive tape or a suitable cement. Each splice holder 238 is preferably made of a soft, resilient foam material and comprises a plurality of slots 247 separated by bands 248. The slots or grooves 247 are each adapted to hold an encased fusion splice therein and, because of the resilience of the holder material, to grip it firmly. As an example, each holder 238 may have six slots 247 so that twelve fusion splices may be contained on one insert. The inserts 237 may be stacked so long as there is room in slots 231 and 232 for the T-shaped members 244 and 246 of each insert, thereby greatly increasing the member of splices held. Inasmuch as a typical fiber ribbon contains twelve fibers, for example, two stacked inserts can contain two hundred and eight-eight fiber splices.

Figure 17A:
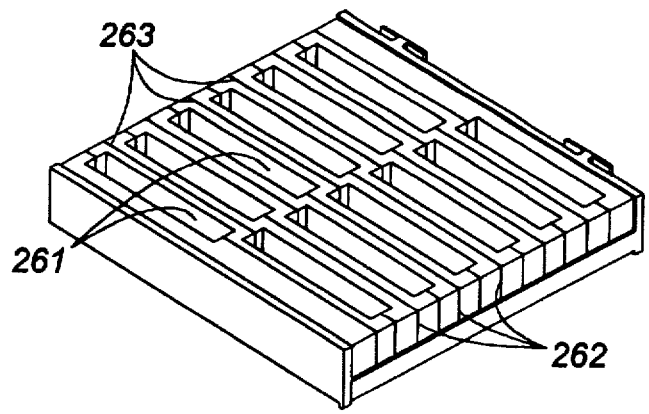
FIG. 17A is a perspective view of a splice holder mounted in the insert of FIG. 16A.
Figure 17B:
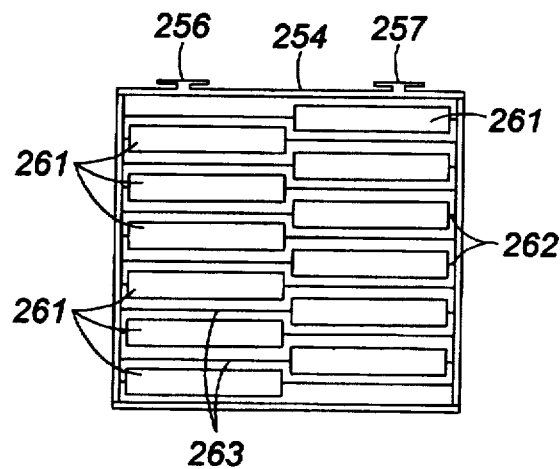
FIG. 17B is a plan view of the holder and insert combination of FIG. 17A.
Figure 17C:
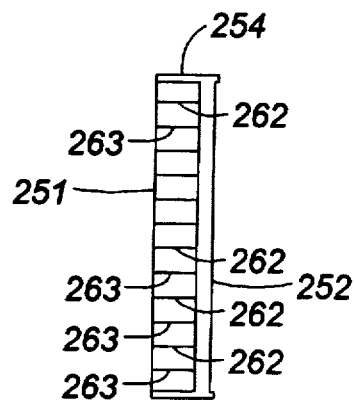
FIG. 17C is a side elevation view of the holder and insert combination of FIG. 17A.

In FIGS. 16A through 16E there is shown an insert 249 which is configured to hold a mechanical splice holder 251 as shown in FIGS. 17A through 17C. Insert 249 which, like insert 237 is preferably made of a suitable hard plastic material, comprises a floor 252, a front wall 253 and a rear wall 254. Insert 249, because of the configuration of splice holder 251, is wider than the shelf 228 of tray 196. On the rear of wall 254 are first and second T-shaped locating and holding members 256 and 257 which function in the same manner as explained with reference to locating and holding members 244 and 246. Insert 249 also has first and second shallow side walls 258 and 259 which assist in holding the splice holder 251 in place on insert 249. As can be seen in FIGS. 17A through 17C, the mechanical splice holder 251 is depicted as mounted on insert 249 and comprises a plurality of off-set cavities 261 which are designed to hold the encased mechanical splices. Holder 261 is preferably made of a soft, resilient foam material that grips the encased mechanical splices. Fiber ribbon entrance into and exit from each of the cavities 261 is via slits 262 and 263 cut in the material of holder 251. An advantage of such an arrangement is that the slits 262, and 263 allow the holder to orient and hold the fiber ribbons leading to the splices and exiting therefrom.

Figure 18A:
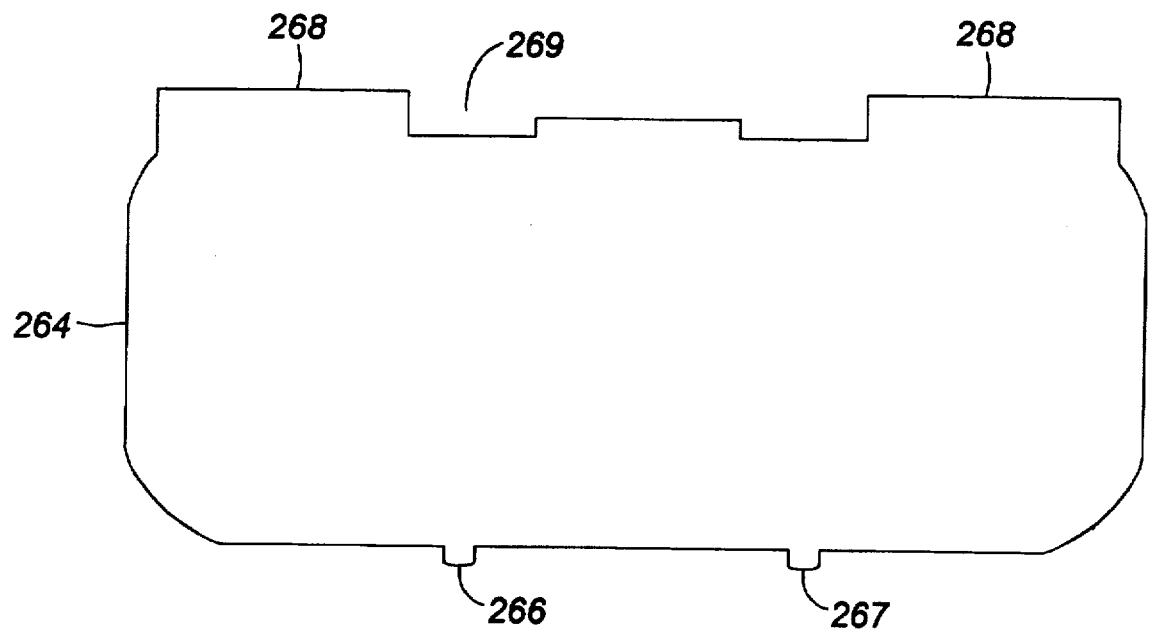
FIG. 18A is a plan view of a cover member for the mass splice tray of FIG. 13A.
Figure 18B:
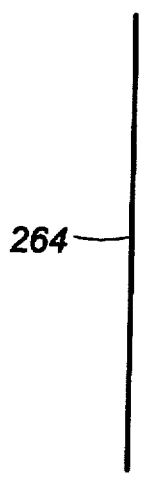
FIG. 18B is a side elevation view of the cover member of FIG. 18A.

In FIG. 18 there is depicted a cover member 264 for tray 196. Cover member 264 which is preferably made of a transparent plastic material has first and second tabs 266 and 267 designed to hit against projections 212 and 213 on tray 196, and act as a means of squeezing the cover so that it bends upward and shortens its width so that it can be easily removed from the splice tray and the rear edges 268 slip under projections 215 on tray 196. Cover 264 also has a cut-out or recessed portion 269 to afford clearance for fiber ribbons being routed from below the adapter plate 59 to a second splice tray 196 stacked upon the first tray 196.

Figure 19:
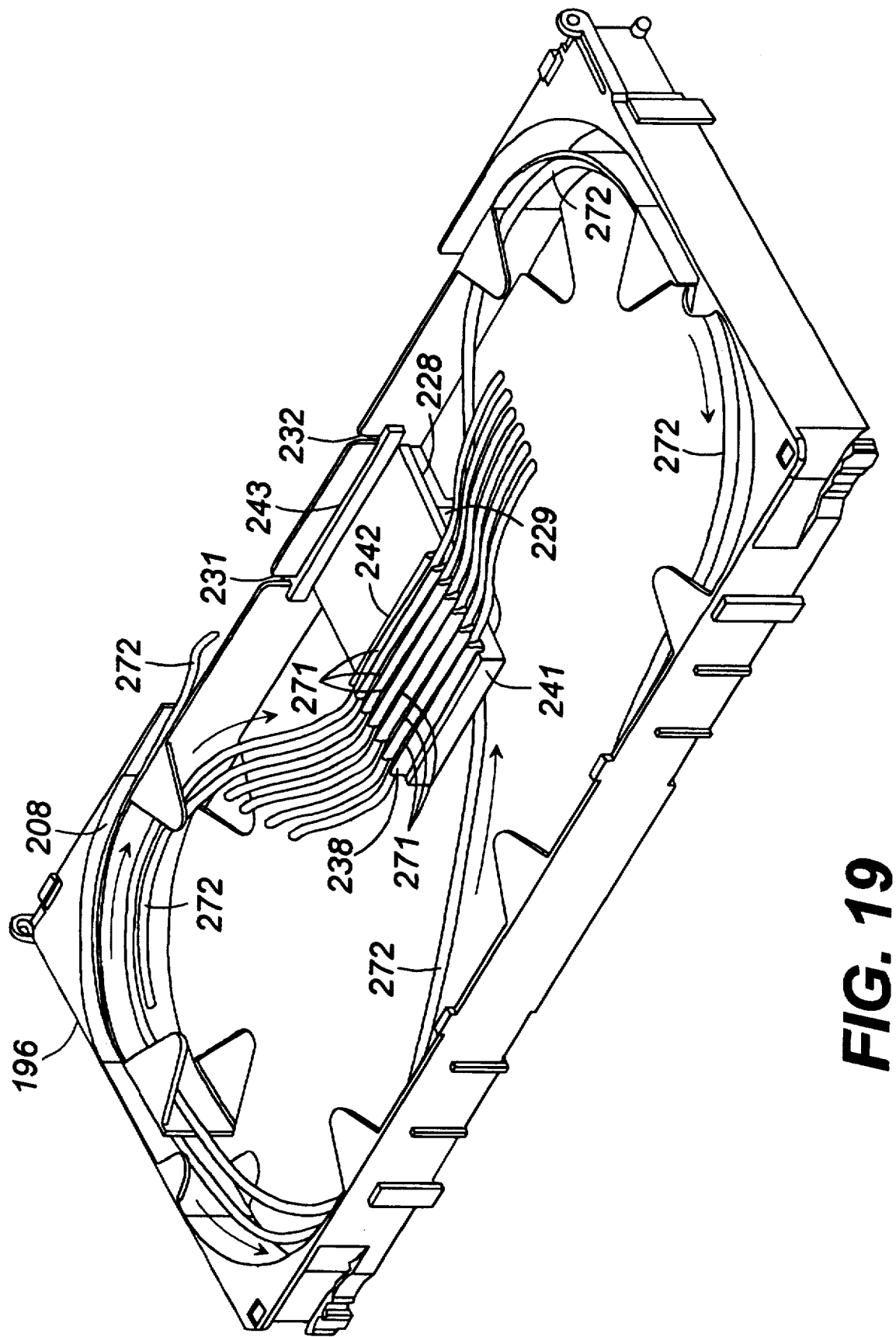
FIG. 19 is a perspective view of the mass splice tray of FIG. 13A showing at least a partial routing of the fiber ribbons therein relative to the splice holder.

FIG. 19 is a perspective view of the mass splice tray 196, with a single fusion splice tray 238 and insert 237 mounted in place. A plurality of ribbon fibers (six in all) are shown leading into splices 271 (shown darkened for clarity), and existing therefrom. A single fiber ribbon 272 is shown darkened for clarity, coming from the storage space below adapter plate 59 and entering channel 208. Ribbon 272 emerges from channel 208 and passes within to curved end walls of tray 196, then diagonally crosses over, as depicted by the arrow, passing under insert 237 and shelf 228 to circle around the opposite end as indicated by the arrow. Curved member 229 insures that the ribbon encounters no sharp edges. It then proceeds to the other end which it circles around, as indicated by the arrows, and then passes into the splice holder 238. Such a routing of the ribbon is made possible by the placement of the splice holders on an elevated shelf, and provides a larger amount of allowable fiber slack. As pointed out hereinbefore, with ribbons it is desirable to have as much slack as can be accommodated.

The unique mass splice tray, 196 and the several components thereof as shown and described herein are the basis of U.S. patent application Ser. No. 08/851,102 of Burek et al., filed concurrently herewith.

The foregoing description and the accompanying drawings have been for purposes of illustrating, in a preferred embodiment, the principles and features of the present invention. The splice closure of the present invention and the several novel components thereof is capable of handling a wide variety of optical fiber cable types without the necessity of customizing to accommodate particular cable types. Further, the closure affords ample storage for fiber slack, and can accommodate large numbers of fiber splices in a sealed enclosure having ready accessibility to the splices.

It should be noted that it will be obvious to those skilled in the art that many variations and modifications may be made to the preferred embodiment without substantial departure from the principles of the present invention. It is intended that all such variations and modifications be included herein as being within the scope of the present invention. Further, in the claims hereinafter set forth, the corresponding structures, materials, acts, and equivalents thereof and of all means or step plus function elements are intended to include any structure, materials, or acts for performing the functions with other elements as specifically claimed.

We claim:

1. A racetrack grommet for providing a seal between first and second flanged closure portions wherein the closure portions define at least one opening in the end which, when the portions are assembled, allow ingress and egress of at least one cable, said racetrack grommet comprising:

a member having first and second longitudinal sides spaced apart a distance such that they fit between the flanges on the first and second flanged closure portions;

each of said longitudinal sides having a first end and a second end, and transverse sections extending between said first ends and said second ends;

at least one insert receiving member in at least one of said transverse sections and having a bore extending therethrough;

first and second insert members for insertion into said bore of said one insert receiving member in abutting relationship;

each of said first and second insert members having a longitudinal bore extending therethrough for containing a cable; and holding means within said bore of said insert receiving member for holding in place said first and second insert members in butting end-to-end relationship.

2. The racetrack grommet as claimed in claim 1 wherein said insert receiving member is cylindrical in shape and has an outer surface adapted to be clamped between said first and second closure portions.

3. The racetrack grommet as claimed in claim 2 wherein said insert receiving member has a longitudinal slit therein extending from said outer surface to said bore thereof.

4. The racetrack grommet as claimed in claim 1 wherein each of said first and second insert members is cylindrical in shape and has an outer surface adapted to fit within said bore of said insert receiving member.

5. The racetrack grommet as claimed in claim 4 wherein each of said first and second insert members has a longitudinal split therein extending from its outer surface to said longitudinal bore.

6. The racetrack grommet as claimed in claim 1 wherein said grommet is made of a flexible resilient material.

7. The racetrack grommet as claimed in claim 6 wherein said material is polyurethane.

8. The racetrack grommet as claimed in claim 1 wherein said first and second inserts are made of a flexible resilient material.

9. The racetrack grommet as claimed in claim 8 wherein said material is polyurethane.

10. A racetrack grommet for providing a seal between first and second flanged closure portions wherein the closure portions define at least one opening in the end which, when the portions are assembled, allow ingress and egress of at least one cable, said racetrack grommet comprising:

a member having first and second longitudinal sides spaced apart a distance such that they fit between the flanges on the first and second flanged closure portions;

each of said longitudinal sides having a first end and a second end, and transverse sections extending between said first ends and said second ends;

at least one insert receiving member in at least one of said transverse sections and having a bore extending therethrough;

first and second insert members for insertion into said bore of said insert receiving member;

each of said insert members being cylindrical in shape and having an outer surface adapted to fit within said bore of said insert receiving member; and having a longitudinal bore extending therethrough for containing a cable;

holding means within said bore of said insert receiving member for holding in place said first and second insert members in butting end-to-end relationship, said holding means comprising a first V-shaped groove in the wall of said bore and a second V-shaped groove in the wall of said bore spaced from said first V-shaped groove.

11. The racetrack grommet as claimed in claim 10 wherein the spacing between said first and second V-shaped grooves is approximately equal to the length of one of said inserts.

12. The racetrack grommet as claimed in claim 10 wherein each of said first and second inserts has a V-shaped ridge on said outer surface thereof.

13. The racetrack grommet as claimed in claim 12 wherein said V-shaped ridge is dimensioned to fit within one of said V-shaped grooves in said bore of said insert receiving member.

14. The racetrack grommet as claimed in claim 12 wherein each of said first and second inserts has first and second ends, and said V-shaped ridge is approximately centrally located between the said first and second ends.

15. A racetrack grommet for providing a seal between first and second flanged closure portions wherein the closure portions define first and second spaced openings in one end thereof and third and fourth openings in the other end thereof and an end compartment adjacent each opening which, when the portions are assembled, allow ingress and egress of cables, said racetrack grommet comprising:

a substantially rectangularly shaped member having first and second longitudinal sides spaced apart a distance such that they fit between the flanges of the first and second flanged closure portions;

each of said longitudinal sides having a first end and a second end;

a first transverse section extending between said first ends and a second transverse section extending between said second ends;

first and second laterally spaced insert receiving members in said first transverse section and third and fourth laterally spaced insert receiving members in said second transverse section;

each of said insert receiving members having an axial bore extending therethrough;

first and second insert members each having a longitudinal bore extending therethrough for containing a cable;

holding means within said bore of each of said insert receiving members for holding in place said first and second insert members in butting end-to-end relationship within said axial bore of each of said insert receiving members; and mating means on each of said insert members for cooperating with said holding means to retain said first and second insert members in place, said mating means and said holding means creating a substantially moisture proof seal between said insert receiving member and said inserts.

16. The racetrack grommet as claimed in claim 15 wherein each of said insert receiving members is cylindrical in shape and has an outer configuration adapted to fit within an end compartment of the closure when assembled and to be clamped between the first and second closure portions.

17. The racetrack grommet as claimed in claim 16 wherein each of said insert receiving members has a longitudinal slit therein extending from said outer surface to said bore thereof.

18. The racetrack grommet as claimed in claim 16 wherein each of said first and second insert members is cylindrical in shape and has an outer surface adapted to fit within said axial bore of said insert receiving member into which said insert members are to be inserted.

19. The racetrack grommet as claimed in claim 18 wherein each of said first and second insert members has a longitudinal slit therein extending from its outer surface to said longitudinal bore therein.

20. The racetrack grommet as claimed in claim 15 wherein said first and second spaced insert receiving members have a web extending therebetween and said third and fourth insert receiving members have a web extending therebetween, said webs being adapted to be clamped between the ends of the first and second closure portions to produce a seal therebetween.

21. The racetrack grommet as claimed in claim 15 wherein said grommet and said insert members are made of a flexible resilient material.

22. The racetrack grommet as claimed in claim 21 wherein said material is polyurethane.

23. The racetrack grommet as claimed in claim 15 and further including at least one port plug member having a cylindrical outer surface for insertion into one of said insert receiving members, said port plug member having an outer surface having mating means thereon for mating with said holding means in said insert receiving member.

24. The racetrack grommet as claimed in claim 23 wherein said mating means is a circumferential V-shaped ridge.

25. The racetrack grommet as claimed in claim 23 wherein said port plug is a substantially hollow cylindrical having at least one closed end.

26. The racetrack grommet as claimed in claim 25 wherein said port plug is made of a rigid plastic material.

27. A racetrack grommet for providing a seal between first and second flanged closure portions wherein the closure portions define first and second spaced openings in one end thereof and third and fourth openings in the other end thereof and an end compartment adjacent each opening which, when the portions are assembled, allow ingress and egress of cables, said racetrack grommet comprising:

a substantially rectangularly shaped member having first and second longitudinal sides spaced apart a distance such that they fit between the flanges of the first and second flanged closure portions;

each of said longitudinal sides having a first end and a second end;

a first transverse section extending between said first ends and a second transverse section extending between said second ends;

first and second spaced insert receiving members ins aid first transverse section and third and fourth spaced insert receiving members in said second transverse section;

each of said insert receiving members being cylindrical in shape having an axial bore extending therethrough and having an outer configuration adapted to fit within an end compartment of the closure when assembled and to be clamped between the first and second closure portions;

first and second insert members having a longitudinal bore extending therethrough for containing a cable;

each of said first and second insert members being cylindrical in shape and having an outer surface adapted to fit within said axial bore of said insert receiving member into which said insert members are to be inserted;

holding means within said bore of each of said insert receiving members for holding in place said first and second insert members in butting end-to-end relationship, said means comprising first and second V-shaped grooves in the wall of said axial bore, said grooves being longitudinally spaced from each other; and mating means on each of said insert members for cooperating with said holding means to retain said first and second insert members in place, said mating means and said holding means creating a substantially moisture proof seal between said insert receiving members and said inserts.

28. The racetrack grommet as claimed in claim 27 wherein said mating means on each of said insert members comprises a circumferential V-shaped ridge on the outer surface thereof.

29. The racetrack grommet as claimed in claim 28 wherein said V-shaped ridge is dimensioned to fit within one of said V-shaped grooves and mate therewith.

30. The racetrack grommet as claimed in claim 24 wherein each of said insert members has first and second ends, and said V-shaped ridge is approximately centrally located between said first and second ends.

31. The racetrack grommet as claimed in claim 30 wherein the spacing between said first and second V-shaped grooves is approximately equal to the length of one of said insert members.

* * * * *